[12] United States Patent
Park et al.

(10) Patent No.: US 8,170,572 B2
(45) Date of Patent: May 1, 2012

(54) METHODS AND APPARATUS FOR SUPPORTING QUALITY OF SERVICE IN COMMUNICATION SYSTEMS

(75) Inventors: Vincent D. Park, Budd Lake, NJ (US);
M. Scott Corson, Gillette, NJ (US);
Murari Srinivasan, Palo Alto, CA (US);
Arnab Das, Summit, NJ (US); Pablo Anigstein, Gillette, NJ (US); Junyi Li, Bedminster, NJ (US); Alan William O'Neill, Henley Beach (AU); Vladimir Parizhisky, New York, NY (US);
Sathyadev Venkata Uppala, Whitehouse Station, NJ (US); Matthew Impett, Annapolis, MD (US)

(73) Assignee: QUALCOMM Incorporated, San Diego, CA (US)

( * ) Notice: Subject to any disclaimer, the term of this patent is extended or adjusted under 35 U.S.C. 154(b) by 914 days.

(21) Appl. No.: 11/486,547

(22) Filed: Jul. 14, 2006

(65) Prior Publication Data
US 2007/0243879 A1 Oct. 18, 2007

Related U.S. Application Data

(60) Provisional application No. 60/792,012, filed on Apr. 14, 2006.

(51) Int. Cl.
*H04W 72/00* (2009.01)
*H04J 3/16* (2006.01)

(52) U.S. Cl. .................................. 455/452.2; 370/469

(58) Field of Classification Search .............. 370/469, 370/237, 343, 453, 392, 329, 252, 310, 520, 370/401, 450, 452.2, 241, 408, 328, 235, 370/230.1, 331, 260, 389, 254, 340, 336, 370/242, 232; 455/450, 452.2, 509, 464, 455/67.11, 411, 453, 67.13
See application file for complete search history.

(56) References Cited

U.S. PATENT DOCUMENTS 6,335,963 B1 1/2002 Bosco
6,557,101 B1 4/2003 MacDonald et al.
(Continued)

FOREIGN PATENT DOCUMENTS

CN 1605218 A 4/2005
(Continued)

OTHER PUBLICATIONS

International Search Report ISA US PCT/US2007/066652 Sep. 25, 2007 Sep. 18, 2007.
(Continued)

*Primary Examiner* — Melody Mehrpour
(74) *Attorney, Agent, or Firm* — Francois A. Pelaez

(57) ABSTRACT

An access node, e.g., base station, determines a configuration of an end node, e.g., wireless terminal, intended to support a specific traffic flow and sends a configuration command to the wireless terminal. A base station may determine one or more parameters associated with classification, queue management, scheduling, and/or automatic repeat request, and then send a configuration command to the wireless terminal instructing it to implement a configuration operation. In some embodiments, a wireless terminal sets the value of an internal parameter to a value directly provided by the base station in a configuration command. In some embodiments, a wireless terminal determines and sets the value of an internal parameter as a function of information included in the configuration command from the base station.

54 Claims, 13 Drawing Sheets

U.S. PATENT DOCUMENTS

| | | | |
|---|---|---|---|
| 6,970,719 B1 | 11/2005 | McConnell et al. | |
| 7,010,305 B2 | 3/2006 | Immonen et al. | |
| 7,154,416 B1 | 12/2006 | Savage | |
| 7,409,428 B1 | 8/2008 | Brabec et al. | |
| 7,426,181 B1 | 9/2008 | Feroz et al. | |
| 2002/0160811 A1 | 10/2002 | Jannette et al. | |
| 2003/0067903 A1 | 4/2003 | Jorgensen | |
| 2003/0119515 A1 | 6/2003 | Holler et al. | |
| 2004/0047324 A1 | 3/2004 | Diener | |
| 2004/0054766 A1 | 3/2004 | Vicente | |
| 2004/0176094 A1* | 9/2004 | Kim et al. | 455/438 |
| 2005/0014509 A1 | 1/2005 | Semper et al. | |
| 2005/0055220 A1 | 3/2005 | Lee et al. | |
| 2006/0014554 A1* | 1/2006 | Gerlach | 455/501 |
| 2006/0069664 A1 | 3/2006 | Ling et al. | |
| 2006/0088058 A1* | 4/2006 | Eckert et al. | 370/469 |
| 2007/0024440 A1 | 2/2007 | Moran et al. | |
| 2007/0147424 A1* | 6/2007 | Anigstein | 370/469 |
| 2007/0298788 A1* | 12/2007 | Corson et al. | 455/433 |
| 2008/0304416 A1* | 12/2008 | Fodor et al. | 370/237 |
| 2009/0097402 A1* | 4/2009 | Stumpert et al. | 370/230.1 |

FOREIGN PATENT DOCUMENTS

| | | |
|---|---|---|
| CN | 1663156 | 8/2005 |
| JP | 2003229901 A | 8/2003 |
| JP | 2005102073 A | 4/2005 |
| JP | 2005512424 T | 4/2005 |
| JP | 2005529545 A | 9/2005 |
| JP | 2005312056 A | 11/2005 |
| JP | 2007525889 A | 9/2007 |
| KR | 1020030047804 | 6/2003 |
| KR | 100469747 | 2/2005 |
| WO | WO2005039229 A1 | 4/2005 |
| WO | WO2005076654 A1 | 8/2005 |
| WO | WO2006058116 | 6/2006 |

OTHER PUBLICATIONS

Taiwanese Search report—096113205—TIPO—Apr. 23, 2010.

Yavatkar R. et al.: RFC 2753 "A Framework for Policy-based Administration Control" Internet Citation, Online, Jan. 2000, XP002179102, Retrieved from the Internet: URL:http://www.ietf.org/rfc/rfc2753.txt?number=2753, retrieved on Oct. 2, 2001, p. 1, line 33-line 38, p. 5, line 40-p. 7, line 29.

Translation of Office Action in Korean application 10-2008-7027962 corresponding to U.S. Appl. 11/537,540, citing KR100469747 and US6557101 dated Jan. 28, 2011.

Written Opinion—PCT/US2007/066652 International Search Authority European Patent Office Sep. 18, 2007.

* cited by examiner

METHODS AND APPARATUS FOR SUPPORTING QUALITY OF SERVICE IN COMMUNICATION SYSTEMS

FIELD OF THE INVENTION

The present application claims priority to provisional U.S. Application Ser. No. 60/792,012, entitled "Method and apparatus for static quality of service" filed Apr. 14, 2006, assigned to the assignee hereof and incorporated herein by reference.

This invention relates to communications system and, more particularly, to methods and apparatus for supporting quality of service differentiation between traffic flows in a communication system.

BACKGROUND

Communication systems frequently include a plurality of network nodes which are coupled to access nodes, e.g., base stations, through which end nodes, e.g., user devices or terminals that may be either fixed or mobile, are coupled to the network.

In a typical cellular communication network, a set of geographically dispersed base stations provide wireless access to a communications infrastructure. Users with wireless communication devices, or terminals, are able to establish a direct communication link with a suitable base station (or set of base stations) and then exchange information with other users and/or end systems throughout the communication network. Such systems could be designed to support a variety of different applications (e.g., telephony, text messaging, streaming audio/video, web browsing, file transfer, etc.); however, traditional systems have been primarily designed for telephony.

Due, in part, to their telephony focused design, traditional, circuit-switched, cellular networks provide little to no support for quality of service differentiation between traffic flows to/from various user devices, e.g., wireless terminals. However, circuit-switched, cellular network technology is presently being extended to support data applications as well. Additionally, there are emerging packet-switched cellular network technologies, which may be better suited for supporting a wide range of applications, including interactive data applications like instant messaging and online gaming. As cellular network technology evolves to support a wider range of diverse applications with differing requirements, new quality of service support mechanisms that enable differentiation between various traffic flows would be desirable. Note that many communication systems other than cellular networks have similar limitations and would also benefit from improved quality of service support mechanisms. Accordingly, there is a need for methods and apparatus that can provide functionality such as treating packets associated with identified traffic flows with different quality of service levels and/or dynamically controlling the quality of service support mechanisms to meet the requirements of various traffic flows.

In view of the above discussion, it should be appreciated that there is a need for new and improved ways of supporting quality of service in communication systems.

SUMMARY

In accordance with various embodiments, an access node, e.g., base station, determines a configuration of an end node, e.g., wireless terminal, intended to support a specific traffic flow and sends a configuration command to the wireless terminal. For example, a base station may determine one or more parameters associated with classification, queue management, scheduling, and/or automatic repeat request, and then send a configuration command to the wireless terminal instructing it to implement a configuration operation. In some embodiments, a wireless terminal sets the value of an internal parameter to a value directly provided by the base station in a configuration command. In some embodiments, a wireless terminal determines and sets the value of an internal parameter as a function of information included in the configuration command from the base station. For example, a configuration command from a base station may include an indication of loss tolerance for packets corresponding to a traffic flow, and a wireless terminal may set the value of automatic repeat request parameters in order to ensure the intended loss tolerance is not exceeded.

An exemplary method of operating an access node in accordance with an exemplary embodiment includes determining wireless terminal configuration parameters corresponding to a traffic flow and communicating a configuration command instructing a wireless terminal, to which the traffic flow corresponds, to implement a configuration operation corresponding to at least one determined configuration parameter. An exemplary base station in accordance with an exemplary embodiment includes a parameter determination module for determining wireless terminal configuration parameters corresponding to a traffic flow and a communication module for communicating a configuration command instructing a wireless terminal, to which the traffic flow corresponds, to implement a configuration operation corresponding to at least one determined configuration parameter.

An exemplary method of operating a wireless terminal in accordance with an exemplary embodiment includes receiving a message including configuration information associated with a traffic flow and implementing a configuration operation using said received configuration information. An exemplary wireless terminal in accordance with an exemplary embodiment includes a receiver for receiving a message including configuration information associated with a traffic flow and a configuration control module for implementing a configuration operation using said received configuration information.

The methods and apparatus of various embodiments for supporting quality of service differentiation between traffic flows in a communication system can be used with a wide range of communications systems. For example various embodiments can be used with systems that support mobile communications devices such as notebook computers equipped with wireless modems and a wide variety of other devices that support wireless interfaces in the interests of device mobility, e.g., phones and/or Personal Digital Assistants (PDAs). Various embodiments can also be used with systems that support fixed communication devices, e.g., coupled to the network via either wireless or wired communication links.

While various embodiments have been discussed in the summary above, it should be appreciated that not necessarily all embodiments include the same features and some of the features described above are not necessary but can be desirable in some embodiments. Numerous additional features, embodiments and benefits of the various embodiments are discussed in the detailed description which follows.

DETAILED DESCRIPTION

Figure 1:
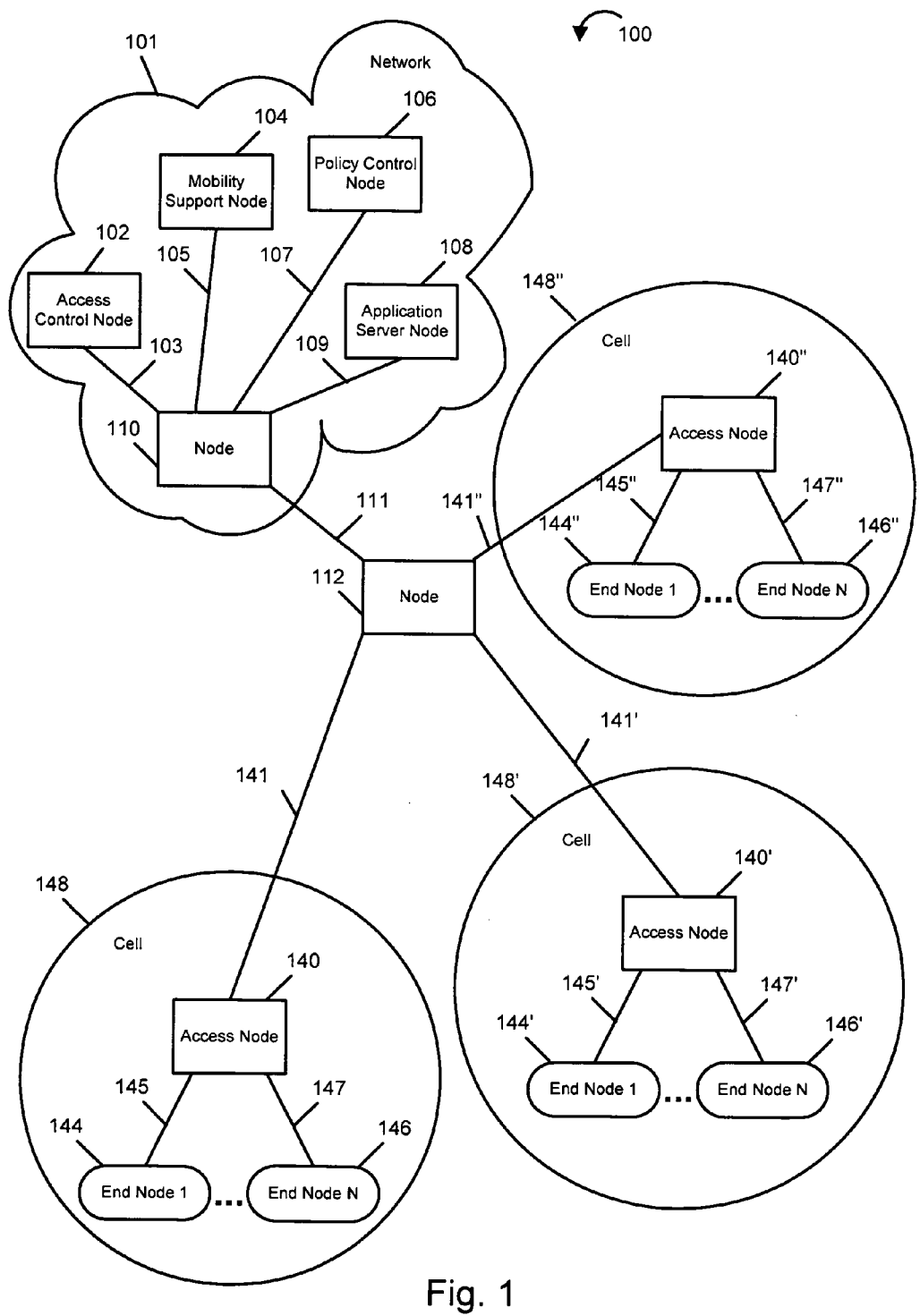
FIG. 1 illustrates a network diagram of an exemplary communications system implemented in accordance with various embodiments.

FIG. 1 illustrates an exemplary communication system 100 implemented in accordance with various embodiments, e.g., a cellular communication network, which comprises a plurality of nodes interconnected by communications links. The network may use Orthogonal Frequency Division Multiplexing (OFDM) signals to communicate information over wireless links. However, other types of signals, e.g., Code Division Multiple Access (CDMA) signals or Time Division Multiple Access (TDMA) signals, might be used instead. Nodes in the exemplary communication system 100 exchange information using signals, e.g., messages, based on communication protocols, e.g., the Internet Protocol (IP). The communications links of the system 100 may be implemented, for example, using wires, fiber optic cables, and/or wireless communications techniques. The exemplary communication system 100 includes a plurality of end nodes 144, 146, 144', 146', 144", 146", which access the communication system via a plurality of access nodes 140, 140', 140". The end nodes 144, 146, 144', 146', 144", 146" may be, e.g., wireless communication devices or terminals, and the access nodes 140, 140', 140" may be, e.g., wireless access routers or base stations. The exemplary communication system 100 also includes a number of other nodes 102, 104, 106, 108, 110, and 112, used to provide interconnectivity or to provide specific services or functions.

The FIG. 1 exemplary system 100 depicts a network 101 that includes an access control node 102, a mobility support node 104, a policy control node 106, and an application server node 108, all of which are connected to an intermediate network node 110 by a corresponding network link 103, 105, 107, and 109, respectively. In some embodiments, the access control node 102, e.g., a Remote Authentication Dial In User Service (RADIUS) or Diameter server, supports authentication, authorization, and/or accounting of end nodes and/or services associated with end nodes. In some embodiments, the mobility support node 104, e.g., a Mobile IP home agent and/or context transfer server, supports mobility, e.g., handoff, of end nodes between access nodes, e.g., via redirection of traffic to/from end nodes and/or transfer of state associated with end nodes between access nodes. In some embodiments, the policy control node 106, e.g., a policy server or Policy Decision Point (PDP), supports policy authorization for services or application layer sessions. In some embodiments, the application server node 108, e.g., a Session Initiation Protocol server, streaming media server, or other application layer server, supports session signaling for services available to end nodes and/or provides services or content available to end nodes.

The intermediate network node 110 in the network 101 provides interconnectivity to network nodes that are external from the perspective of the network 101 via network link 111. Network link 111 is connected to another intermediate network node 112, which provides further connectivity to a plurality of access nodes 140, 140', 140" via network links 141, 141', 141", respectively.

Each access node 140, 140', 140" is depicted as providing connectivity to a plurality of N end nodes (144, 146), (144', 146'), (144", 146"), respectively, via corresponding access links (145, 147), (145', 147'), (145", 147"), respectively. In the exemplary communication system 100, each access node 140, 140', 140" is depicted as using wireless technology, e.g., wireless access links, to provide access. A radio coverage area, e.g., communications cell, 148, 148', 148" of each access node 140, 140', 140", respectively, is illustrated as a circle surrounding the corresponding access node.

The exemplary communication system 100 is subsequently used as a basis for the description of various embodiments. Alternative embodiments include various network topologies, where the number and type of nodes (including network nodes, access nodes, end nodes, as well as various control, support, and server nodes), the number and type of links, and the interconnectivity between various nodes may differ from that of the exemplary communication system 100 depicted in FIG. 1.

In various embodiments some of the functional entities depicted in FIG. 1 may be omitted or combined. The location or placement of these functional entities in the network may also be varied.

Figure 2:
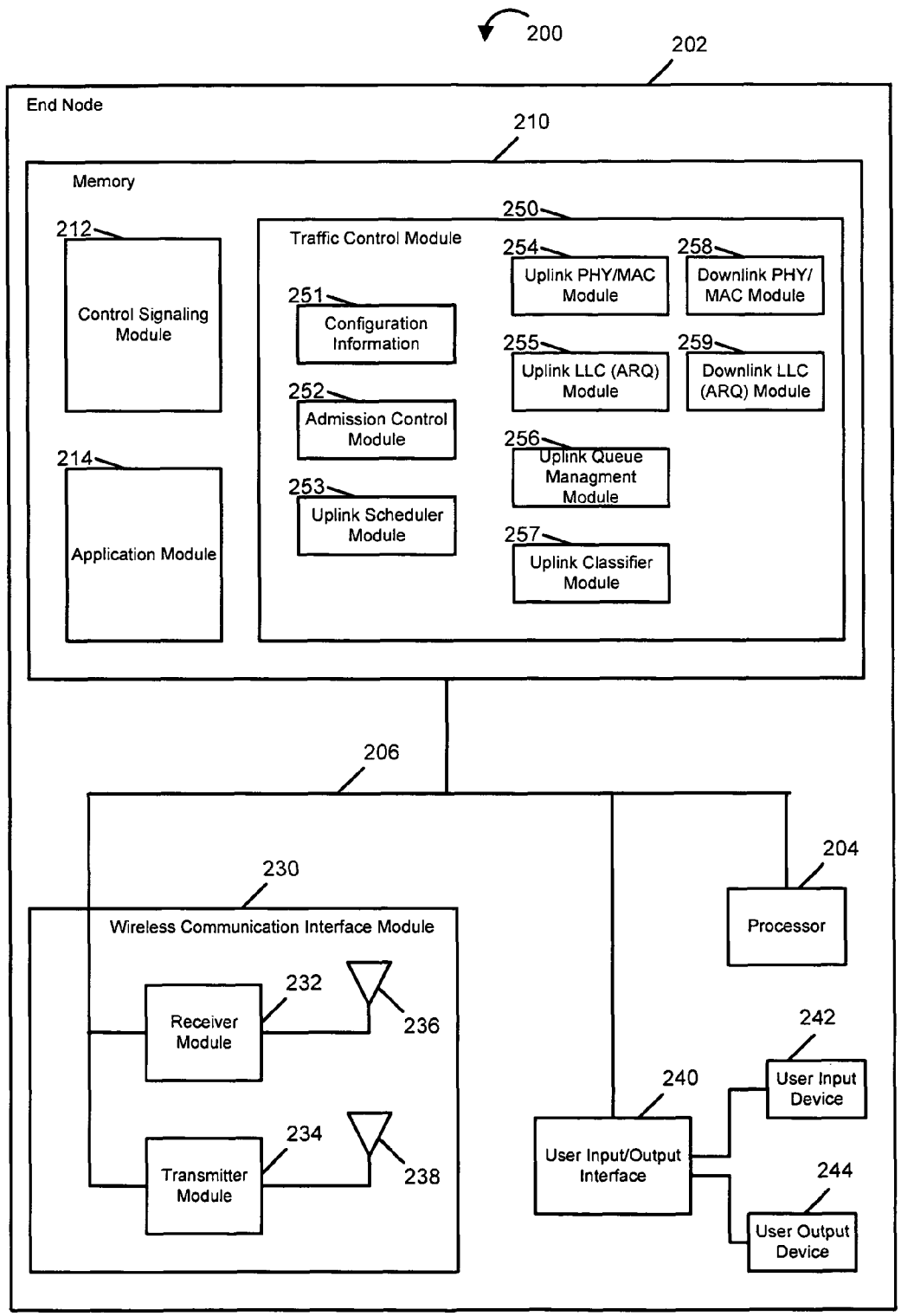
FIG. 2 illustrates an exemplary end node implemented in accordance with various embodiments.

FIG. 2 provides a detailed illustration of an exemplary end node 200, e.g., wireless terminal, implemented in accordance with various embodiments. The exemplary end node 200, depicted in FIG. 2, is a detailed representation of an apparatus that may be used as any one of the end nodes 144, 146, 144', 146', 144", 146", depicted in FIG. 1. In the FIG. 2 embodiment, the end node 200 includes a processor 204, a wireless communication interface module 230, a user input/output interface 240 and memory 210 coupled together by bus 206. Accordingly, via bus 206 the various components of the end node 200 can exchange information, signals and data. The components 204, 206, 210, 230, 240 of the end node 200 are located inside a housing 202.

The wireless communication interface module 230 provides a mechanism by which the internal components of the end node 200 can send and receive signals to/from external devices and network nodes, e.g., access nodes. The wireless communication interface module 230 includes, e.g., a receiver module 232 with a corresponding receiving antenna 236 and a transmitter module 234 with a corresponding transmitting antenna 238 used for coupling the end node 200 to other network nodes, e.g., via wireless communications channels.

The exemplary end node 200 also includes a user input device 242, e.g., keypad, and a user output device 244, e.g., display, which are coupled to bus 206 via the user input/output interface 240. Thus, user input/output devices 242, 244 can exchange information, signals and data with other components of the end node 200 via user input/output interface 240 and bus 206. The user input/output interface 240 and associated devices 242, 244 provide a mechanism by which a user can operate the end node 200 to accomplish various tasks. In particular, the user input device 242 and user output device 244 provide the functionality that allows a user to control the end node 200 and applications, e.g., modules, programs, routines and/or functions, that execute in the memory 210 of the end node 200.

The processor 204 under control of various modules, e.g., routines, included in memory 210 controls operation of the end node 200 to perform various signaling and processing. The modules included in memory 210 are executed on startup or as called by other modules. Modules may exchange data, information, and signals when executed. Modules may also share data and information when executed. In the FIG. 2 embodiment, the memory 210 of end node 200 includes a control signaling module 212, an application module 214, and a traffic control module 250, which further includes configuration information 251 and various additional modules 252, 253, 254, 255, 256, 257, 258, and 259.

The control signaling module 212 controls processing relating to receiving and sending signals, e.g., messages, for controlling operation and/or configuration of various aspects of the end node 200 including, e.g., the traffic control module 250 as well as the configuration information 251 and the various additional modules included therein 252, 253, 254, 255, 256, 257, 258, and 259. In some embodiments, the control signaling module 212 includes state information, e.g., parameters, status and/or other information, relating to operation of the end node 200 and/or one or more signaling protocols supported by the control signaling module 212. In particular, the control signaling module 212 may include configuration information, e.g., end node identification information and/or parameter settings, and operational information, e.g., information about current processing state, status of pending message transactions, etc.

The application module 214 controls processing and communications relating to one or more applications supported by the end node 200. In some embodiments, application module 214 processing includes tasks relating to input/output of information via the user input/output interfaces 240, manipulation of information associated with an application, and/or receiving or sending signals, e.g., messages, associated with an application. In some embodiments, the application module 214 includes state information, e.g., parameters, status and/or other information, relating to operation of one or more applications supported by the application module 214. In particular, the application module 214 may include configuration information, e.g., user identification information and/or parameter settings, and operational information, e.g., information about current processing state, status of pending responses, etc. Applications supported by the application module 214 include, e.g., Voice over IP (VoIP), web browsing, streaming audio/video, instant messaging, file sharing, gaming, etc.

The traffic control module 250 controls processing relating to receiving and sending data information, e.g., messages, packets, and/or frames, via the wireless communication interface module 230. The exemplary traffic control module includes configuration information 251 as well as various additional modules 252, 253, 254, 255, 256, 257, 258, and 259 that control various aspects of quality of service for packets and/or traffic flows, e.g., associated sequences of packets. In some embodiments, the traffic control module 250 includes state information, e.g., parameters, status and/or other information, relating to operation of the end node 200, the traffic control module 250, and/or one or more of the various additional modules included therein 252, 253, 254, 255, 256, 257, 258, and 259. The configuration information 251, e.g., parameter settings, determines, affects and/or prescribes operation of the traffic control module 250 and/or the various additional modules included therein 252, 253, 254, 255, 256, 257, 258, and 259. The various additional modules are included, in some embodiments, to perform particular functions and operations as needed to support specific aspects of traffic control. In various embodiments, modules may be omitted and/or combined as needed depending on the functional requirements of traffic control. A description of each additional module included in the exemplary traffic control module 250 follows.

The admission control module 252 maintains information relating to resource utilization/availability and determines if sufficient resources are available to support the quality of service requirements of particular traffic flows. Resource availability information maintained by the admission control module 252 includes, e.g., packet and/or frame queuing capacity, scheduling capacity, as well as processing and memory capacity needed to support one or more traffic flows. The control signaling module 212, application module 214, and/or other modules included in the end node 200 may, and in some embodiments do, query the admission control module 252 to determine if sufficient resources are available to support a new or modified traffic flow, where the admission control determination is a function of the quality of service requirements of the particular traffic flow and/or the available resources. The configuration information 251 may, and in some embodiments does, include configuration information, e.g., parameters settings, that affect the operation of the admission control module 252, e.g., an admission control threshold value that indicates the percentage of resource that may be allocated prior to rejecting additional requests.

The uplink scheduler module 253 controls processing relating to transmission scheduling, e.g., order and/or timing, and allocation of transmission resources, e.g., information coding rate, transmission time slots, and/or transmission power, for data information, e.g., messages, packets, and/or frames, to be sent via the wireless interface module 230, e.g., from the end node 200 to an access node. The uplink scheduler module 253 may, and in some embodiments does, schedule transmissions and allocate transmission resources as a function of the quality of service requirements and/or constraints associated with one or more traffic flows. The configuration information 251 may, and in some embodiments does, include configuration information, e.g., parameters settings, that affect the operation of the uplink scheduler module 253, e.g., a priority, rate bound, latency bound, and/or sharing weight associated with one or more traffic flows. In some embodiments, scheduling and/or resource allocation operations performed by the uplink scheduler module 253 are additionally a function of channel conditions and other factors, e.g., power budget.

The uplink PHY/MAC module 254 controls physical (PHY) layer and Media Access Control (MAC) layer processing relating to sending data information, e.g., messages, packets, and/or frames, via the wireless communication interface module 230, e.g., from the end node 200 to an access node. In some embodiments, operation of the uplink PHY/MAC module 254 includes both sending and receiving control information, e.g., signals or messages, to coordinate sending of data information, e.g., messages, packets, or frames. The configuration information 251 may, and in some embodiments does, include configuration information, e.g., parameters settings, that affect the operation of the uplink PHY/MAC module 254, e.g., a frequency, band, channel, spreading code or hoping code to be used for transmissions, an identifier associated with the end node 200, a request dictionary prescribing use of an assignment request channel, etc.

The uplink LLC (ARQ) module 255 controls Logical Link Control (LLC) layer processing relating to sending data information, e.g., messages, packets, and/or frames, via the wireless communication interface module 230, e.g., from the end node 200 to an access node. The uplink LLC (ARQ) module 255 includes processing associated with Automatic Repeat Request (ARQ) capabilities, e.g., retransmission of lost packets or frames. In some embodiments, the uplink LLC (ARQ) module 255 further includes processing relating to the addition of an LLC header and/or trailer to higher layer messages, e.g., packets, to provide additional functionality, e.g., multi-protocol multiplexing/demultiplexing via a type field or error detection via a checksum field. The uplink LLC (ARQ) module 255 may also, and in some embodiments does, perform fragmentation of higher layer messages, e.g., packets, into multiple sub-portions, e.g., frames to be sent by the uplink PHY/MAC module 254. The configuration information 251 may, and in some embodiments does, include configuration information, e.g., parameters settings, that affect the operation of the uplink LLC (ARQ) module 255, e.g., an ARQ window size, maximum number of retransmissions, a discard timer, etc.

The uplink queue management module 256 maintains information and controls processing relating to storage of data information, e.g., messages, packets, and/or frames, to be sent via the wireless communication interface module 230, e.g., from the end node 200 to an access node. The uplink queue management module 256 may, and in some embodiments does, control storage of data information awaiting transmission and maintain state information regarding data information awaiting transmission on a per traffic flow basis, e.g., packets associated with each traffic flow may be stored in separate queues. In some embodiments, the uplink queue management module 256 supports a variety of queue management techniques and/or capabilities, e.g., head drop, tail drop, as well as various Active Queue Management (AQM) mechanisms such as Random Early Detection (RED). The configuration information 251 may, and in some embodiments does, include configuration information, e.g., parameters settings, that affect the operation of the uplink queue management module 256, e.g., a queue limit, drop strategy, and/or AQM thresholds associated with one or more traffic flows.

The uplink classifier module 257 controls processing relating to identification of data information, e.g., messages, packets, and/or frames, as belonging to particular traffic flows prior to being sent via the wireless communication interface module 230, e.g., from the end node 200 to an access node. In some embodiments, messages, packets, and/or frames to be sent via the wireless communication interface module 230 are classified as belonging to one of a variety of traffic flows by the uplink classifier module 257 based on inspection of one or more header and/or payload fields. The results of classification by the uplink classifier module 257 may, and in some embodiments do, affect the treatment of the classified data information, e.g., messages, packets, and/or frames, by the uplink queue management module 256 and other modules 253, 254, 255, e.g., the results may determine a particular queue the message, packet, and/or frame will be associated with for storage and further affect subsequent processing such as scheduling. The configuration information 251 may, and in some embodiments does, include configuration information, e.g., parameters settings, that affect the operation of the uplink classifier module 257, e.g., a set of one or more classifier filter rules that prescribe criteria used to associate data information, e.g., messages, packets, and/or frames, as belonging to one or more traffic flows.

The downlink PHY/MAC module 258 controls PHY layer and MAC layer processing relating to receiving data information, e.g., packets and/or frames, via the wireless communication interface module 230, e.g., from an access node to the end node 200. In some embodiments, operation of the downlink PHY/MAC module 258 includes both sending and receiving control information, e.g., signals or messages, to coordinate receiving of data information, e.g., messages, packets, or frames. The configuration information 251 may, and in some embodiments does, include configuration information, e.g., parameters settings, that affect the operation of the downlink PHY/MAC module 258, e.g., a frequency, band, channel, spreading code or hoping code to be used for reception, an identifier associated with the end node 200, etc.

The downlink LLC (ARQ) module 259 controls LLC layer processing relating to receiving data information, e.g., packets and/or frames, via the wireless communication interface module 230, e.g., from an access node to the end node 200. The downlink LLC (ARQ) module 259 includes processing associated with ARQ capabilities, e.g., retransmission of lost packets or frames. In some embodiments, the downlink LLC (ARQ) module 259 further includes processing relating to an LLC header and/or trailer that encapsulates higher layer messages, e.g., packets, which provides additional functionality, e.g., multi-protocol multiplexing/demultiplexing via a type field or error detection via a checksum field. The downlink LLC (ARQ) module 259 may also, and in some embodiments does, perform reassembly of frames received by the downlink PHY/MAC module 258 into higher layer messages, e.g., packets. The configuration information 251 may, and in some embodiments does, include configuration information, e.g., parameters settings, that affect the operation of the downlink LLC (ARQ) module 259, e.g., an ARQ window size, maximum number of retransmissions, a discard timer, etc.

Figure 3:
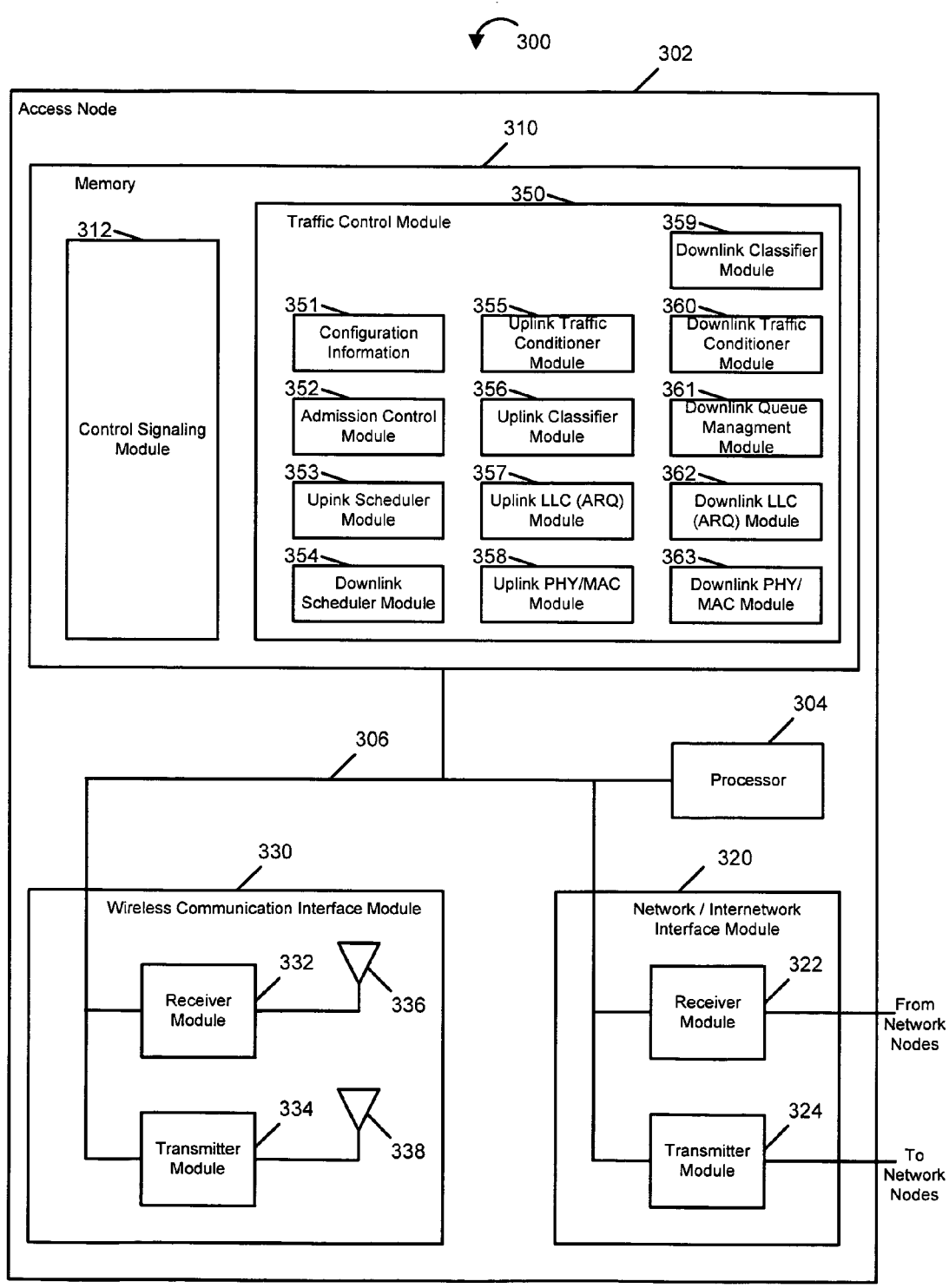
FIG. 3 illustrates an exemplary access node implemented in accordance with various embodiments.

FIG. 3 provides a detailed illustration of an exemplary access node 300 implemented in accordance with various embodiments. The exemplary access node 300, depicted in FIG. 3, is a detailed representation of an apparatus that may be used as any one of the access nodes 140, 140', 140" depicted in FIG. 1. In the FIG. 3 embodiment, the access node 300 includes a processor 304, memory 310, a network/internetwork interface module 320 and a wireless communication interface module 330, coupled together by bus 306. Accordingly, via bus 306 the various components of the access node 300 can exchange information, signals and data. The components 304, 306, 310, 320, 330 of the access node 300 are located inside a housing 302.

The network/internetwork interface module 320 provides a mechanism by which the internal components of the access node 300 can send and receive signals to/from external devices and network nodes. The network/internetwork interface module 320 includes, a receiver module 322 and a transmitter module 324 used for coupling the node 300 to other network nodes, e.g., via copper wires or fiber optic lines. The wireless communication interface module 330 also provides a mechanism by which the internal components of the access node 300 can send and receive signals to/from external devices and network nodes, e.g., end nodes. The wireless communication interface module 330 includes, e.g., a receiver module 332 with a corresponding receiving antenna 336 and a transmitter module 334 with a corresponding transmitting antenna 338. The wireless communication interface module 330 is used for coupling the access node 300 to other nodes, e.g., via wireless communication channels.

The processor 304 under control of various modules, e.g., routines, included in memory 310 controls operation of the access node 300 to perform various signaling and processing. The modules included in memory 310 are executed on startup or as called by other modules. Modules may exchange data, information, and signals when executed. Modules may also share data and information when executed. In the FIG. 3 embodiment, the memory 310 of access node 300 includes a control signaling module 312 and a traffic control module 350, which further includes configuration information 351 and various additional modules 352, 353, 354, 355, 356, 357, 358, 359, 360, 361, 362, and 363.

The control signaling module 312 controls processing relating to receiving and sending signals, e.g., messages, for controlling operation and/or configuration of various aspects of the access node 300 including, e.g., the traffic control module 350 as well as the configuration information 351 and the various additional modules included therein 352, 353, 354, 355, 356, 357, 358, 359, 360, 361, 362, and 363. In some embodiments, the control signaling module 312 includes state information, e.g., parameters, status and/or other information, relating to operation of the access node 300 and/or one or more signaling protocols supported by the control signaling module 312. In particular, the control signaling module 312 may include configuration information, e.g., access node identification information and/or parameter settings, and operational information, e.g., information about current processing state, status of pending message transactions, etc.

The traffic control module 350 controls processing relating to receiving and sending data information, e.g., messages, packets, and/or frames, via the wireless communication interface module 330. The exemplary traffic control module 350 includes configuration information 351 as well as various additional modules 352, 353, 354, 355, 356, 357, 358, 359, 360, 361, 362, and 363 that control various aspects of quality of service for packets and/or traffic flows, e.g., associated sequences of packets. In some embodiments, the traffic control module 350 includes state information, e.g., parameters, status and/or other information, relating to operation of the access node 300, the traffic control module 350, and/or one or more of the various additional modules included therein 352, 353, 354, 355, 356, 357, 358, 359, 360, 361, 362, and 363. The configuration information 351, e.g., parameter settings, determines, affects and/or prescribes operation of the traffic control module 350 and/or the various additional modules included therein 352, 353, 354, 355, 356, 357, 358, 359, 360, 361, 362, and 363. The various additional modules are included, in some embodiments, to perform particular functions and operations as needed to support specific aspects of traffic control. In various embodiments, modules may be omitted and/or combined as needed depending on the functional requirements of traffic control. A description of each additional module included in the exemplary traffic control module 350 follows.

The admission control module 352 maintains information relating to resource utilization/availability and determines if sufficient resources are available to support the quality of service requirements of particular traffic flows. Resource availability information maintained by the admission control module 352 includes, e.g., packet and/or frame queuing capacity, scheduling capacity, as well as processing and memory capacity needed to support one or more traffic flows. The control signaling module 312 and/or other modules included in the access node 300 may, and in some embodiments do, query the admission control module 352 to determine if sufficient resources are available to support a new or modified traffic flow, where the admission control determination is a function of the quality of service requirements of the particular traffic flow and/or the available resources. The configuration information 351 may, and in some embodiments does, include configuration information, e.g., parameters settings, that affect the operation of the admission control module 352, e.g., an admission control threshold value that indicates the percentage of resource that may be allocated prior to rejecting additional requests.

The uplink scheduler module 353 controls processing relating to transmission scheduling, e.g., order and/or timing, and allocation of transmission resources, e.g., information coding rate, transmission time slots, and/or transmission power, for data information, e.g., messages, packets, and/or frames, to be sent from one or more end nodes to the access node via the wireless interface module 330. The uplink scheduler module 353 may, and in some embodiments does, schedule transmissions and allocate transmission resources as a function of the quality of service requirements and/or constraints associated with one or more traffic flows and/or one or more end nodes. The configuration information 351 may, and in some embodiments does, include configuration information, e.g., parameters settings, that affect the operation of the uplink scheduler module 353, e.g., a priority, rate bound, latency bound, and/or sharing weight associated with one or more traffic flows and/or end nodes. In some embodiments, scheduling and/or resource allocation operations performed by the uplink scheduler module 353 are additionally a function of channel conditions and other factors, e.g., power budget.

The downlink scheduler module 354 controls processing relating to transmission scheduling, e.g., order and/or timing, and allocation of transmission resources, e.g., information coding rate, transmission time slots, and/or transmission power, for data information, e.g., messages, packets, and/or frames, to be sent from the access node 300 to one or more end nodes via the wireless interface module 330. The downlink scheduler module 354 may, and in some embodiments does, schedule transmissions and allocate transmission resources as a function of the quality of service requirements and/or constraints associated with one or more traffic flows and/or one or more end nodes. The configuration information 351 may, and in some embodiments does, include configuration information, e.g., parameters settings, that affect the operation of the downlink scheduler module 354, e.g., a priority, rate bound, latency bound, and/or sharing weight associated with one or more traffic flows and/or end nodes. In some embodiments, scheduling and/or resource allocation operations performed by the downlink scheduler module 354 are additionally a function of channel conditions and other factors, e.g., power budget.

The uplink traffic conditioner module 355 controls processing relating to traffic conditioning, e.g., metering, marking, policing, etc., for data information, e.g., messages, packets, and/or frames, received via the wireless interface module 330, e.g., from an end node to the access node 300. The uplink traffic conditioner module 355 may, and in some embodiments does, condition traffic, e.g., meter, mark and/or police, as a function of the quality of service requirements and/or constraints associated with one or more traffic flows and/or one or more end nodes. The configuration information 351 may, and in some embodiments does, include configuration information, e.g., parameters settings, that affect the operation of the uplink traffic conditioner module 355, e.g., a rate bound, and/or marking value associated with one or more traffic flows and/or end nodes.

The uplink classifier module 356 controls processing relating to identification of data information, e.g., messages, packets, and/or frames, received via the wireless interface module 330, e.g., from an end node to the access node 300, as belonging to particular traffic flows prior to being processed by uplink traffic conditioner module 355. In some embodiments, messages, packets, and/or frames received via the wireless communication interface module 330 are classified as belonging to one of a variety of traffic flows by the uplink classifier module 356 based on inspection of one or more header and/or payload fields. The results of classification by the uplink classifier module 356 may, and in some embodiments do, affect the treatment of the classified data information, e.g., messages, packets, and/or frames, by the uplink traffic conditioner module 355, e.g., the results may determine a particular data structure or state machine the message, packet, and/or frame will be associated with and further affect subsequent processing such as metering, marking, and/or policing. The configuration information 351 may, and in some embodiments does, include configuration information, e.g., parameters settings, that affect the operation of the uplink classifier module 356, e.g., a set of one or more classifier filter rules that prescribe criteria used to associate data information, e.g., messages, packets, and/or frames, as belonging to one or more traffic flows.

The uplink LLC (ARQ) module 357 controls LLC layer processing relating to receiving data information, e.g., packets and/or frames, via the wireless communication interface module 330, e.g., from an end node to the access node 300. The uplink LLC (ARQ) module 357 includes processing associated with ARQ capabilities, e.g., retransmission of lost packets or frames. In some embodiments, the uplink LLC (ARQ) module 357 further includes processing relating to an LLC header and/or trailer that encapsulates higher layer messages, e.g., packets, which provides additional functionality, e.g., multi-protocol multiplexing/demultiplexing via a type field or error detection via a checksum field. The uplink LLC (ARQ) module 357 may also, and in some embodiments does, perform reassembly of frames received by the uplink PHY/MAC module 358 into higher layer messages, e.g., packets. The configuration information 251 may, and in some embodiments does, include configuration information, e.g., parameters settings, that affect the operation of the uplink LLC (ARQ) module 357, e.g., an ARQ window size, maximum number of retransmissions, a discard timer, etc.

The uplink PHY/MAC module 358 controls PHY layer and MAC layer processing relating to receiving data information, e.g., packets and/or frames, via the wireless communication interface module 330, e.g., from an end node to the access node 300. In some embodiments, operation of the uplink PHY/MAC module 358 includes both sending and receiving control information, e.g., signals or messages, to coordinate receiving of data information, e.g., messages, packets, or frames. The configuration information 351 may, and in some embodiments does, include configuration information, e.g., parameters settings, that affect the operation of the uplink PHY/MAC module 358, e.g., a frequency, band, channel, spreading code or hoping code to be used for reception, an identifier associated with the access node 300, etc.

The downlink classifier module 359 controls processing relating to identification of data information, e.g., messages, packets, and/or frames, as belonging to particular traffic flows prior to being sent via the wireless communication interface module 330, e.g., from the access node 300 to an end node. In some embodiments, messages, packets, and/or frames to be sent via the wireless communication interface module 330 are classified as belonging to one of a variety of traffic flows by the downlink classifier module 359 based on inspection of one or more header and/or payload fields. The results of classification by the downlink classifier module 359 may, and in some embodiments do, affect the treatment of the classified data information, e.g., messages, packets, and/or frames, by the downlink queue management module 361 and other modules 360, 362, 363, e.g., the results may determine a particular queue the message, packet, and/or frame will be associated with for storage and further affect subsequent processing such as scheduling. The configuration information 351 may, and in some embodiments does, include configuration information, e.g., parameters settings, that affect the operation of the downlink classifier module 359, e.g., a set of one or more classifier filter rules that prescribe criteria used to associate data information, e.g., messages, packets, and/or frames, as belonging to one or more traffic flows.

The downlink traffic conditioner module 360 controls processing relating to traffic conditioning, e.g., metering, marking, policing, etc., for data information, e.g., messages, packets, and/or frames, to be sent via the wireless interface module 330, e.g., from the access node 300 to an end node. The downlink traffic conditioner module 360 may, and in some embodiments does, condition traffic, e.g., meter, mark and/or police, as a function of the quality of service requirements and/or constraints associated with one or more traffic flows and/or one or more end nodes. The configuration information 351 may, and in some embodiments does, include configuration information, e.g., parameters settings, that affect the operation of the downlink traffic conditioner module 360, e.g., a rate bound, and/or marking value associated with one or more traffic flows and/or end nodes.

The downlink queue management module 361 maintains information and controls processing relating to storage of data information, e.g., messages, packets, and/or frames, to be sent via the wireless communication interface module 330, e.g., from the access node 300 to an end node. The downlink queue management module 361 may, and in some embodiments does, control storage of data information awaiting transmission and maintain state information regarding data information awaiting transmission on a per traffic flow basis, e.g., packets associated with each traffic flow may be stored in separate queues. In some embodiments, the downlink queue management 361 module supports a variety of queue management techniques and/or capabilities, e.g., head drop, tail drop, as well as various AQM mechanisms such as RED. The configuration information 351 may, and in some embodiments does, include configuration information, e.g., parameters settings, that affect the operation of the downlink queue management module 361, e.g., a queue limit, drop strategy, and/or AQM thresholds associated with one or more traffic flows.

The downlink LLC (ARQ) module 362 controls LLC layer processing relating to sending data information, e.g., messages, packets, and/or frames, via the wireless communication interface module 330, e.g., from the access node 300 to an end node. The downlink LLC (ARQ) module 362 includes processing associated with ARQ capabilities, e.g., retransmission of lost packets or frames. In some embodiments, the downlink LLC (ARQ) module 362 further includes processing relating to the addition of an LLC header and/or trailer to higher layer messages, e.g., packets, to provide additional functionality, e.g., multi-protocol multiplexing/demultiplexing via a type field or error detection via a checksum field. The downlink LLC (ARQ) module 362 may also, and in some embodiments does, perform fragmentation of higher layer messages, e.g., packets, into multiple sub-portions, e.g., frames to be sent by the downlink PHY/MAC module 363. The configuration information 351 may, and in some embodiments does, include configuration information, e.g., parameters settings, that affect the operation of the downlink LLC (ARQ) module 362, e.g., an ARQ window size, maximum number of retransmissions, a discard timer, etc.

The downlink PHY/MAC module 363 controls PHY layer and MAC layer processing relating to sending data information, e.g., messages, packets, and/or frames, via the wireless communication interface module 330, e.g., from the access node 300 to an end node. In some embodiments, operation of the downlink PHY/MAC module 363 includes both sending and receiving control information, e.g., signals or messages, to coordinate sending of data information, e.g., messages, packets, or frames. The configuration information 351 may, and in some embodiments does, include configuration information, e.g., parameters settings, that affect the operation of the downlink PHY/MAC module 363, e.g., a frequency, band, channel, spreading code or hoping code to be used for transmissions, an identifier associated with the access node 300, etc.

Figure 4:
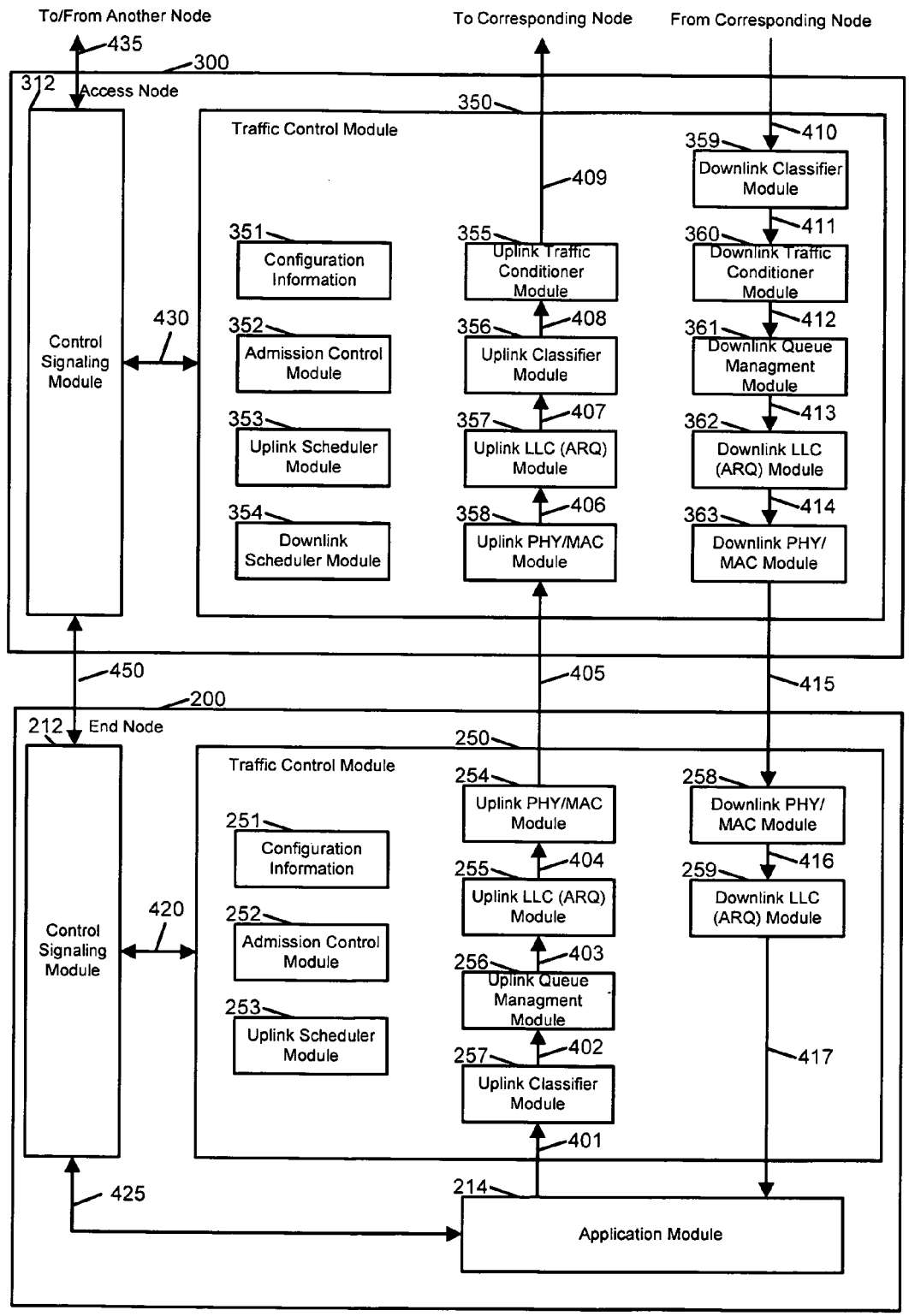
FIG. 4 illustrates exemplary signaling and traffic flows between various modules included in an end node and an access node performed in accordance with various embodiments.

FIG. 4 illustrates exemplary signaling and traffic flows between various modules included in an exemplary end node 200 and an exemplary access node 300 in accordance with various embodiments. The FIG. 4 end node 200 and FIG. 4 access node 300 are simplified representations of the FIG. 2 end node 200 and FIG. 3 access node 300, respectively. The FIG. 4 example shows an application module 214 sending 401 and receiving 417 data information, e.g., traffic flows comprising a sequence of messages, packets, or frames. In the context of the FIG. 1 exemplary system, the FIG. 4 end node 200 may be any one of the end nodes 144, 146, 144', 146', 146'', 146'' depicted FIG. 1 and the application module 214 included in the FIG. 4 end node 200 may be exchanging data information with another node in the system, e.g., another end node 144, 146, 144', 146', 146'', 146'' or the application server node 108 as depicted in FIG. 1. In FIG. 4 and the subsequent description, the node with which the FIG. 4 end node 200 is exchanging data information is referred to as the corresponding node.

The data information, e.g., traffic flows comprising a sequence of messages, packets, or frames, sent from the application module 214 in the end node 200 to a corresponding node is shown by a sequence of arrows 401, 402, 403, 404, 405 to proceed through a sequence of modules 257, 256, 255, 254 included in the end node 200 for processing, after which the data information is sent 405 from the end node 200 to the access node 300, e.g., via the wireless communication interface module 230. Following reception 405 by the access node 300, e.g., via the wireless communication interface module 330, the data information, e.g., traffic flows comprising a sequence of messages, packets, or frames, sent from the application module 214 in the end node 200 to the corresponding node is shown by a sequence of arrows 405, 406, 407, 408, 409 to proceed through a sequence of modules 358, 357, 356, 355 included in the access node 300 for processing, prior to being forwarded 409 from the access node 300 toward the corresponding node, e.g., directed in accordance with routing information to an intermediate node connected to the access node via the network/internetwork interface module 320.

The data information, e.g., traffic flows comprising a sequence of messages, packets, or frames, sent from a corresponding node to the application module 214 in the end node is shown by a sequence of arrows 410, 411, 412, 413, 414, 415 to be received by the access node 300, e.g., via the network/internetwork interface module 320, and then to proceed through a sequence of modules 359, 360, 361, 362, 363 included in the access node 300 for processing, after which the data information is sent 415 from the access node 300 to the end node 200, e.g., via the wireless communication interface module 330. Following reception 415 by the end node 200, e.g., via the wireless communication interface module 230, the data information, e.g., traffic flows comprising a sequence of messages, packets, or frames, sent from the corresponding node to the application module 214 in the end node 200 is shown by a sequence of arrows 415, 416, 417 to proceed through a sequence of modules 258, 259 included in the end node 200 for processing, prior to being delivered 417 to the application module 214 in the end 200.

In addition to the exchange of data information, e.g., traffic flows, FIG. 4. also depicts the exchange of control information, e.g., signaling flows and/or communication interfaces, represented by two headed arrows 420, 425, 430, 435, 450. In particular, the FIG. 4 example depicts the exchange of control information 430 between the control signaling module 312 and the traffic control module 350 included in the access node 300. Similarly, the FIG. 4 example depicts the exchange of control information 420 between the control signaling module 212 and the traffic control module 250 included in the end node 200. In both the access node 300 and the end node 200, the exchange of control information between the modules as shown allows the respective control signaling module 312/212 in the access/end node 300/200 to affect, e.g., set, modify, and/or monitor, the configuration and/or operation of the various modules included in the respective traffic control module 350/250, as needed to provide the proper quality of service treatment of the data information, e.g., traffic flows, to/from the application module 214 in the end node 200.

The exchange of control information, e.g., signaling flows and/or communication interfaces, is also shown a) 435 between another node and the control signaling module 312 in the access node 300, b) 425 between the application module 214 in the end node 200 and the control signaling module 212 in the end node 200, and c) 450 between the respective control signaling modules 312/212 in the access node 300 and end node 200. These exchanges of control information, e.g., signaling flows and/or communication interfaces, enable the configuration and/or operation of the traffic control modules 350/250 in both the access node 300 and the end node 200 to be affected by a) one or more additional nodes, e.g. the access control node 102 and/or application server node 108, b) the application module 214 in the end node 200, or c) a combination of one or more additional nodes and the application module 214 in the end node 200. Various embodiments may, and do, support all or only a subset of the depicted control information exchanges as needed.

FIGS. 5 through 9 illustrate exemplary signaling performed in accordance with exemplary embodiments. Each of FIGS. 5 through 9 depicts an end node 200, which is a simplified representation of the FIG. 2 exemplary end node 200 implemented in accordance with various embodiments. Similarly, access nodes 300, 300' depicted in FIGS. 5 through 9 are simplified representations of the FIG. 3 exemplary access node 300 implemented in accordance with various embodiments. In each of FIGS. 5 through 9, the signaling is illustrated in the context of FIG. 1 exemplary system 100. Thus, end node 200 in FIGS. 5 through 9 corresponds to any of the end nodes 144, 146, 144', 146', 144", 146" of the exemplary system 100, while access nodes 300, 300' in FIGS. 5 through 9 correspond to any of the access nodes 140, 140', 140" of the exemplary system 100. FIGS. 5 through 9 also depict various other network nodes (e.g., access control node 102, policy control node 106, and/or application server node 108) of the exemplary system 100 as needed for the purpose of illustrating the exemplary signaling.

In FIGS. 5 through 9, the vertical solid line 501, 502, 503, 601, 602, 603, 604, 701, 702, 703, 704, 801, 802, 803, 804, 805, 901, 902, 903, extending below each depicted node represents a timeline for signals sent and/or received by the node, where time progresses "down" the timeline. Thus, portions of a timeline closer to the top of a figure represent earlier time than portions of a timeline closer to the bottom of the figure. Solid horizontal arrows 515, 520, 525, 610, 630, 635, 730, 735, 815, 850, 855, 910, 925 represent signals between nodes, with the arrowhead indicating direction from sender to receiver. Dashed horizontal arrow 615 represents alternative signals between nodes applicable in alternative scenarios, with the arrowhead indicating direction from sender to receiver. Dotted horizontal arrows 620, 625, 715, 720, 725, 820, 825, 835, 840, 845, 915, 920 represent optional signals between nodes used in some embodiments, with the arrowhead indicating direction from sender to receiver. Wide double-ended arrows 510, 510', 810, 830 represent groups of signals exchanged between nodes for some functional purpose. A signal is communicated to or from a particular node if the line representing such signal or group of signals indicates a dot at the vertical line representing said node in time. For example, referring to FIG. 5, signal 515 is transmitted at time 515c by the access control 102 and is received by the access node 300 at time 515b. FIGS. 5 through 9 are subsequently described in detail.

Figure 5:
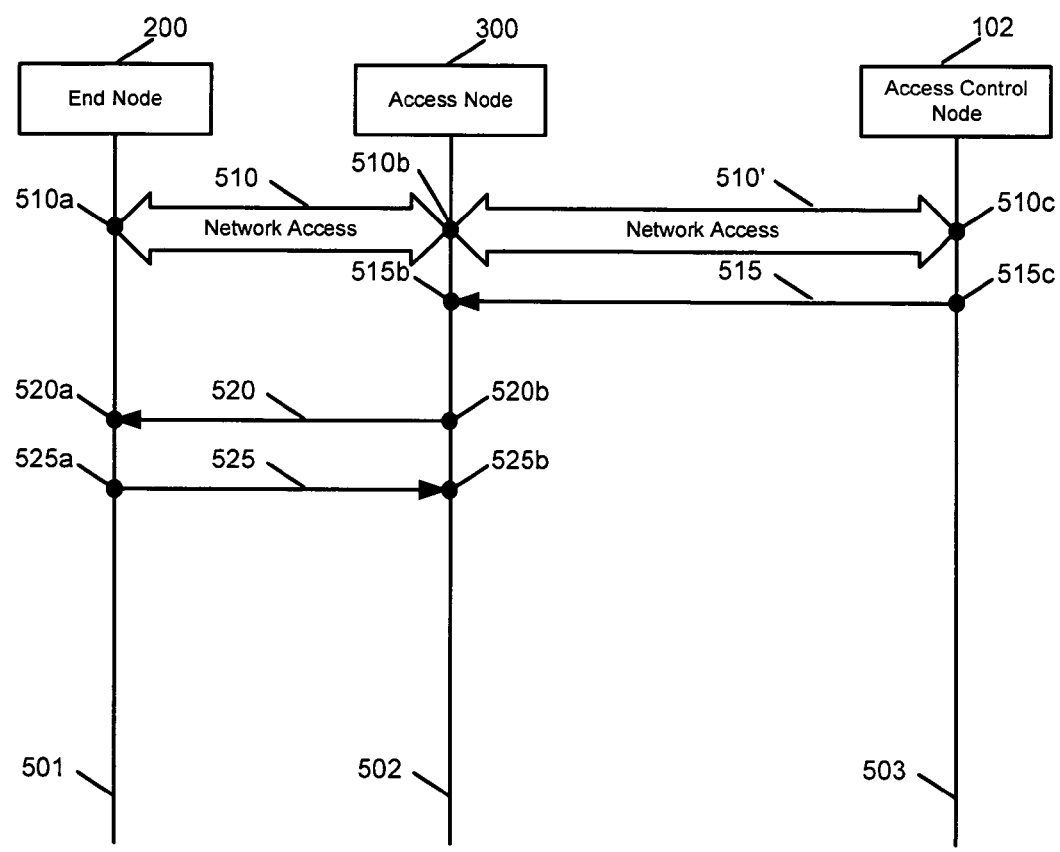
FIG. 5 illustrates exemplary signaling performed in accordance with various embodiments, when an end node is granted network access via an access node.

Exemplary network access grant signaling and related operations will now be described. FIG. 5 illustrates exemplary signaling performed in accordance with various embodiments, when an end node 200 is granted network access via an access node 300. In FIG. 5, the end node 200 at point 510a sends a signal, part of the group of signals 510, to the access node 300 requesting network access. The access node 300 receives the signal, part of group of signals 510, at point 510b and sends another signal, part of group of signals 510' to the access control node 102, indicating a request for network access by the end node 200. The access control node 102 receives the signal, part of group of signals 510', at point 510c and performs operations, as needed to determine if network access should be granted to the end node 200. The end node 200, access node 300, and access control node 102 may, and in some embodiments do, exchange additional signals as part of the group of signals 510, 510' for the purpose of controlling network access, e.g., authentication and authorization. The access control node 102 at point 515c sends an access grant signal 515, e.g., message, to the access node 300, indicating that the end node 200 should be granted network access.

In accordance with various embodiments, the access grant signal 515 may, and in some embodiments does, include information pertaining to quality of service treatment, e.g., specification of traffic flow identification criteria, a traffic flow profile, service requirements and/or service constraints, for one or more traffic flows. The access node 300 receives the access grant signal 515 at point 515b and performs operations as needed to grant network access to the end node 200 and determines the appropriate access node 300 and end node 200 configurations, e.g., settings for one or more adjustable modules and/or values for one or more adjustable parameters, as needed to provide quality of service to each identified traffic flow.

The access node 300 at point 520b sends a configuration command signal 520, e.g., message, to the end node 200, instructing the end node 200 to implement a configuration operation corresponding to the configuration determined by the access node 300. In some embodiments, the configuration command signal 520 includes configuration information that enables the end node 200 to implement a configuration corresponding to one or more traffic flows e.g., to adjust the settings for one or more adjustable modules and/or adjust the values for one or more adjustable parameters. The configuration command signal instructs the end node 200 to, e.g., set the value of one or more internal parameters to parameter values determined by the access node 300; and/or set the value of one or more internal parameters to values determined by the end node 200 based on parameter values determined by the access node 300. The end node 200 receives the configuration command signal 520 at point 520a and performs a configuration operation in accordance with the configuration information provided by the configuration command signal 520. The end node 200 at point 525a sends a configuration response signal 525 to the access node 300, indicating that the configuration changes as instructed by the access node 300 have been completed by the end node 200.

Figure 6:
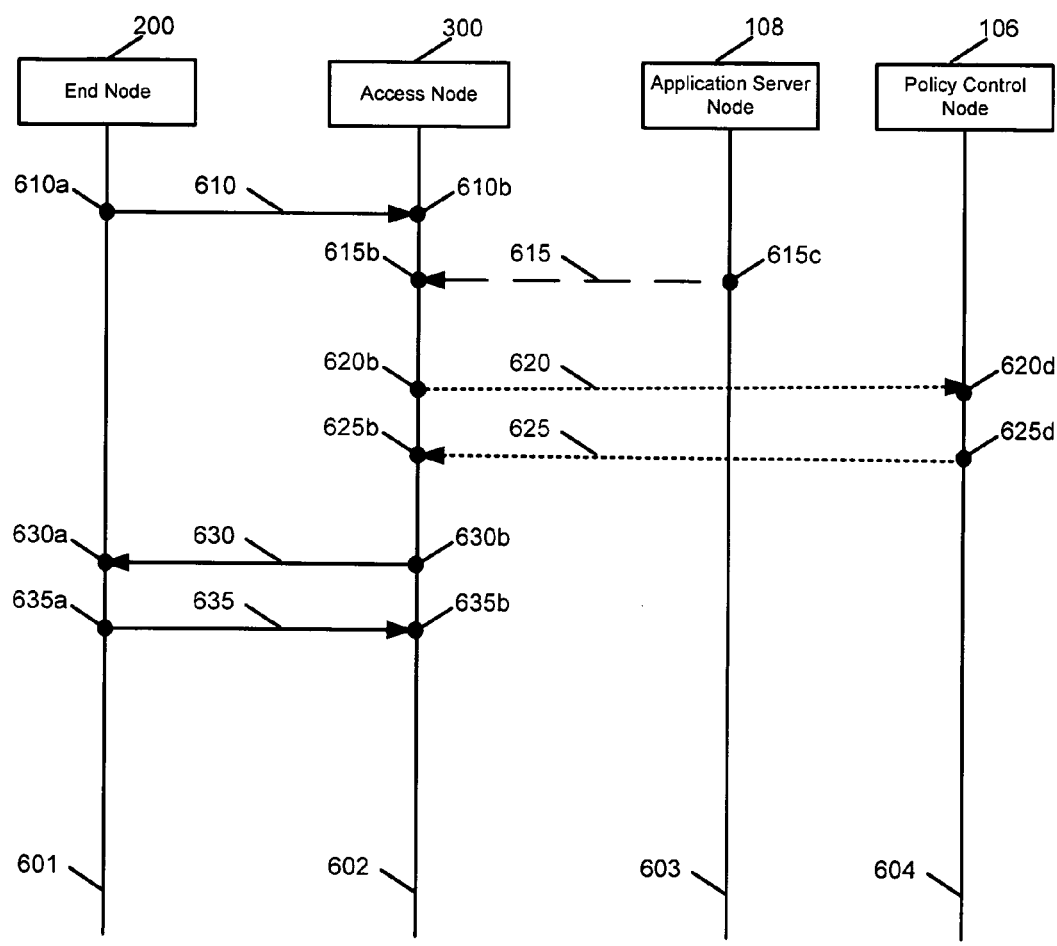
FIG. 6 illustrates exemplary signaling performed in accordance with various embodiments, when quality of service support for a traffic flow to or from an end node is added, modified, or deleted by either the end node or another network node.

Exemplary Quality of Service support request related signaling and operations will now be described. FIG. 6 illustrates exemplary signaling performed in accordance with various embodiments, when quality of service support for a traffic flow to or from an end node 200 is added, modified, or deleted by either the end node 200 or another network node, e.g., an application server node 108. In FIG. 6, the end node 200 at point 610a sends a quality of service request signal 610 to the access node 300 requesting a change in quality of service support for one or more traffic flows. FIG. 6 also illustrates an alternative quality of service request signal 615 that is applicable in an alternative scenario. In the exemplary alternative scenario, the application server node 108 at point 615c sends a quality of service request signal 615 to the access node 300 requesting a change in the quality of service support for one or more traffic flows to and/or from the end node 200. Thus, while the first quality of service request signal 610 illustrates the case where quality service support changes pertaining to traffic flows to and/or from the end node 200 are requested by the end node 200, the alternative quality of service request signal 615 illustrates the case where quality service support changes pertaining to traffic flows to and/or from the end node 200 are requested by another network node, e.g., the application server node 108.

In accordance with various embodiments, the quality of service request signal 610 and/or the alternative quality of service request signal 615 may be, and is some embodiments is, used to request a variety of different quality of service support changes, e.g., add quality of service support for a new traffic flow, modify quality of service support of a previously known traffic flow, delete or terminate quality of service support of a previously known traffic flow. In each case, the quality of service request signal 610, 615 may, and in some embodiments does, include information pertaining to quality of service treatment, e.g., specification of traffic flow identification criteria, a traffic flow profile, service requirements and/or service constraints, for one or more traffic flows to and/or from the end node 200. When the access node 300 receives the quality of service request signal 610 at point 610*b* and/or the alternative quality of service request signal 615 at point 615*b*, the access node 300 initiates the process of determining whether the requested quality of service support changes will be supported and, if so, determining the appropriate access node 300 and end node 200 configurations, e.g., settings for one or more adjustable modules and/or values for one or more adjustable parameters, as needed to provide quality of service to each identified traffic flow.

In accordance with various embodiments, the process of determining whether the requested quality of service support changes will be supported includes, e.g., making a resource admission control determination and/or making a policy control determination. As part of determining whether the requested quality of service support changes will be supported, the access node 300 may, and in some embodiments does, exchange signaling 620, 625 with a policy control node 106, e.g., a network node functioning as a policy decision point. FIG. 6 illustrates this optional policy control signaling exchange 620, 625. In FIG. 6, the access node 300 at point 620*b* sends a policy decision request signal 620 to the policy control node 106 requesting a policy decision corresponding to the requested quality of service support changes. The policy control node 106 receives the policy decision request signal 620 at point 620*d* and performs a policy check, e.g., determines if requested quality of service support changes are authorized for the end node 200 and/or correspond to a valid application layer session. The policy control node 106 at point 625*d* send a policy decision response signal 625 to the access node 300, indicating whether the requested quality of service changes are approved. The access node 300 receives the policy decision response signal 625 at point 625*b*.

Given that the required resource admission control checks and/or policy control checks have passed, the access node 300 at point 630*b* sends a configuration command signal 630, e.g., message, to the end node 200, instructing the end node 200 to implement a configuration operation corresponding to the configuration determined by the access node 300. In some embodiments, the configuration command signal 630 includes configuration information that enables the end node 200 to implement a configuration corresponding to one or more traffic flows e.g., to adjust the settings for one or more adjustable modules and/or adjust the values for one or more adjustable parameters. The configuration command signal instructs the end node 200 to, e.g., set the value of one or more internal parameters to parameter values determined by the access node 300; and/or set the value of one or more internal parameters to values determined by the end node 200 based on parameter values determined by the access node 300. The end node 200 receives the configuration command signal 630 at point 630*a* and performs a configuration operation in accordance with the configuration information provided by the configuration command signal 630. The end node 200 at point 635*a* sends a configuration response signal 635 to the access node 300, indicating that the configuration changes as instructed by the access node 300 have been completed by the end node 200.

Figure 7:
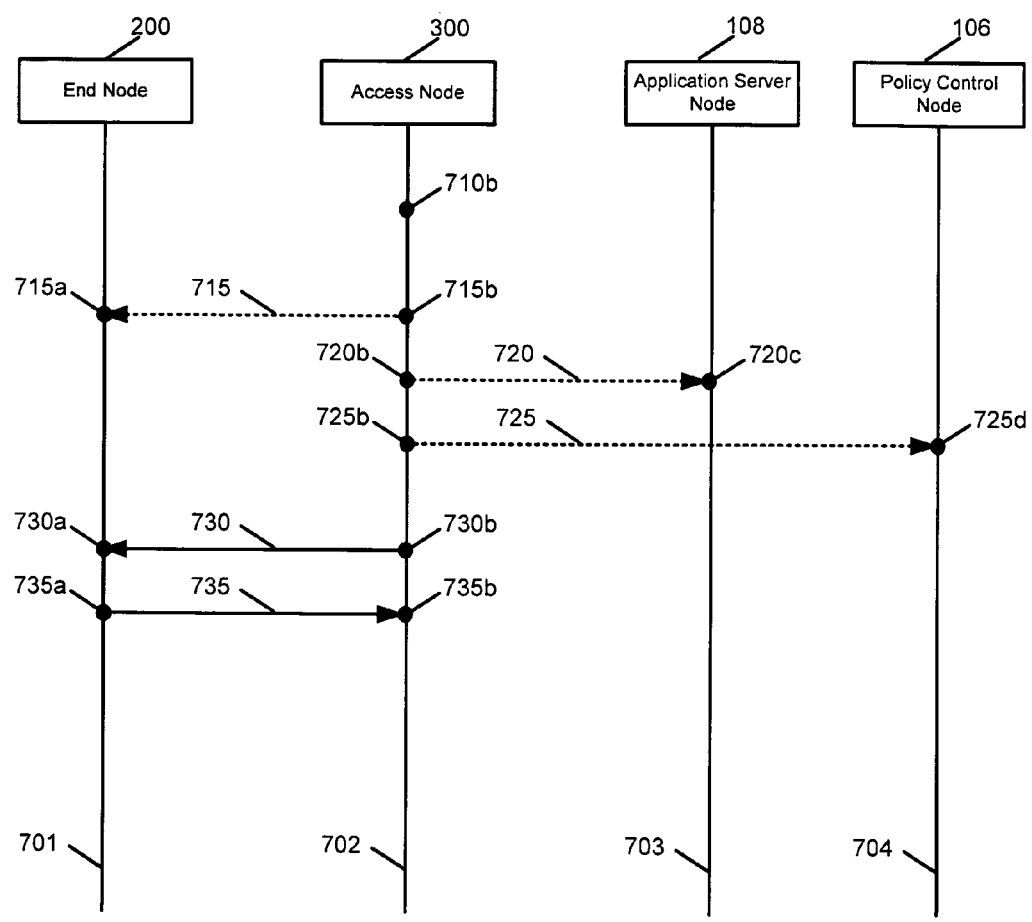
FIG. 7 illustrates exemplary signaling performed in accordance with various embodiments, when quality of service support for a traffic flow to or from an end node is revoked by an access node.

Exemplary Quality of Service support revocation signaling and related operations will now be described. FIG. 7 illustrates exemplary signaling performed in accordance with various embodiments, when quality of service support for a traffic flow to or from an end node 200 is revoked by an access node 300. In FIG. 7, the highest dot 710*b* on the access node 300 timeline 702 represents a time at which quality of service support for one or more traffic flows to and/or from the end node 200 is being terminated by the access node 300. Termination of quality of service support for one or more traffic flows to and/or from the end node 200 at the indicated time 710*b* can correspond to a variety of different events, scenarios, and/or conditions, e.g., preemption by the access node 300 in favor of supporting another higher priority traffic flow to and/or from the same or a different end node, inability of the access node 300 to continue providing the required service due to degradation of access link, expiry of authorization or another policy constraint. When terminating quality of service support for a traffic flow, the access node 300 may, and in some embodiments does, send a revocation notification signal 715, 720, 725 to one or more network nodes. FIG. 7 illustrates this optional revocation notification signaling 715, 720, 725. In FIG. 7, the access node 300 sends a revocation notification signal 715 to the end node 200 at point 715*b*, a revocation notification signal 720 to the application server node 108 at point 720*b*, and a revocation notification signal 725 to the policy control node 106 at point 725*b*, in each case indicating that quality of service support for one or more traffic flows to and/or from the end node 200 have been terminated. The end node 200 receives its revocation notification signal 715 at point 715*a*, the application server node 108 receives its revocation notification signal 720 at point 720*c*, and the policy control node 106 receives its revocation notification signal 725 at point 725*d*. In each case, upon reception of the revocation notification signal 715, 720, 725 the respective receiving node performs additional operations as needed, e.g., deletion of internal state corresponding to the terminated quality of service support, logging of the event, etc.

In accordance with various embodiments, upon terminating quality of service support for one or more traffic flows at the indicated time 710*b*, the access node 300 determines the appropriate access node 300 and end node 200 configurations, e.g., settings for one or more adjustable modules and/or values for one or more adjustable parameters, as needed to reflect termination of quality of service support for one ore more identified traffic flows. The access node 300 at point 730*b* sends a configuration command signal 730, e.g., message, to the end node 200, instructing the end node 200 to implement a configuration operation corresponding to the configuration determined by the access node 300. In some embodiments, the configuration command signal 730 includes configuration information that enables the end node 200 to implement a configuration corresponding to one or more traffic flows e.g., to adjust the settings for one or more adjustable modules and/or adjust the values for one or more adjustable parameters. The configuration command signal instructs the end node 200 to, e.g., set the value of one or more internal parameters to parameter values determined by the access node 300; and/or set the value of one or more internal parameters to values determined by the end node 200 based on parameter values determined by the access node 300. The end node 200 receives the configuration command signal 730 at point 730*a* and performs a configuration operation in accordance with the configuration information provided by the configuration command signal 730. The end node 200 at point 735*a* sends a configuration response signal 735 to the access node 300, indicating that the configuration changes as instructed by the access node 300 have been completed by the end node 200.

Figure 8:
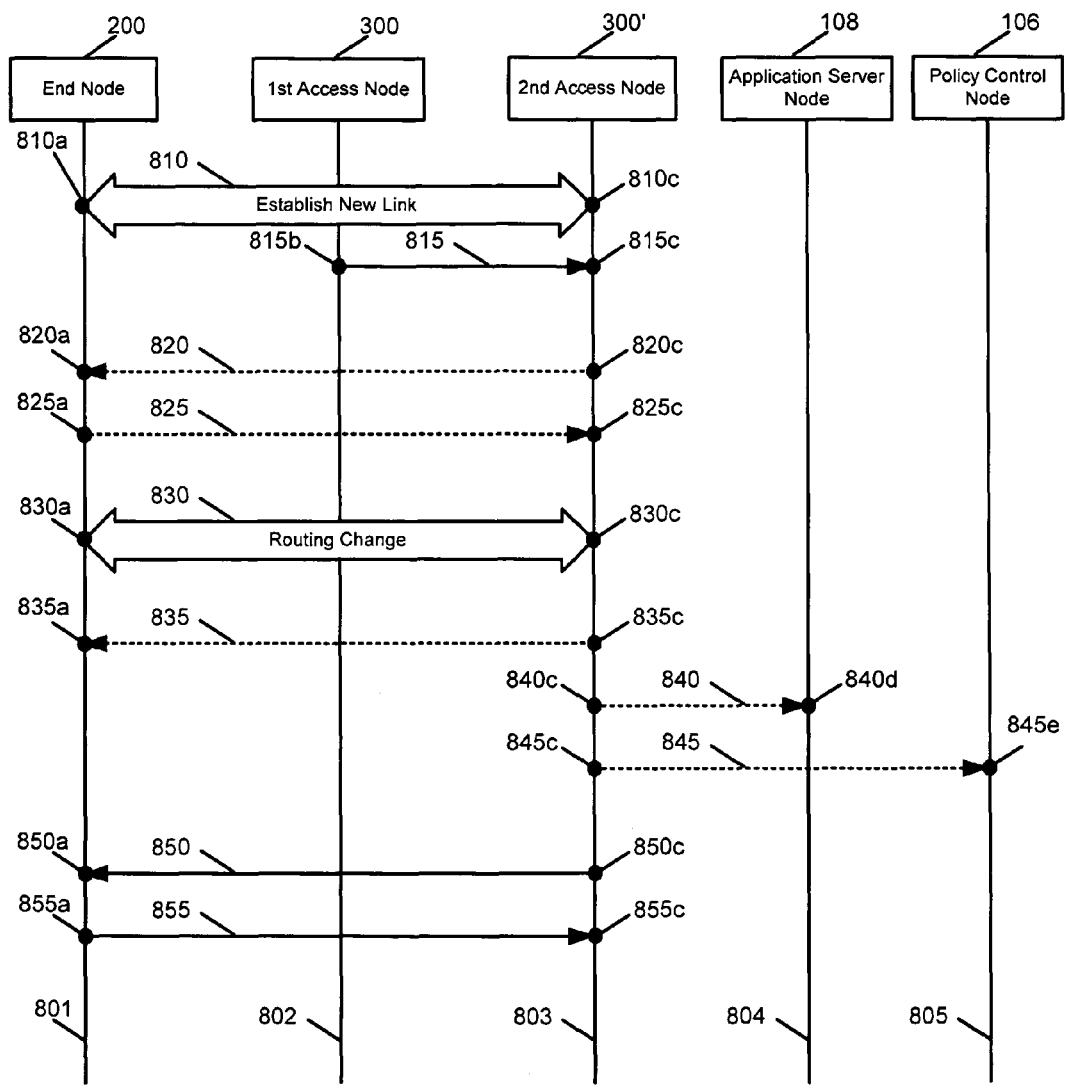
FIG. 8 illustrates exemplary signaling performed in accordance with various embodiments, when an end node changes its point of attachment to the network from a first access node to a second access node.

An exemplary changing of a point of network attachment will now be described. FIG. 8 illustrates exemplary signaling performed in accordance with various embodiments, when an end node 200 changes its point of attachment to the network from a first access node 300 to a second access node 300'. In FIG. 8, the initial condition is assumed to be one wherein the end node 200 has an existing link with the first access node 300 through which the end node 200 may send/receive traffic flows, e.g., the condition that exists at the end of the time sequence depicted in FIG. 5. The end node 200 at point 810a sends a signal, part of the group of signals 810, to the second access node 300' initiating establishment of a new link to the second access node 300'. The second access node 300' receives the signal, part of group of signals 810, at point 810b and performs further operations as needed to establish a link with the end node 200. The details regarding establishment of a new link may differ in various embodiments. For example, signaling may be exchanged with or relayed by other nodes, e.g., the first access node 300, and/or the existing link with the first access node 300 may be terminated prior to establishing the new link with the second access node 300'.

In conjunction with establishment of the new link, the first access node 300 at point 815b sends a context transfer signal 815 to the second access node 300'. In accordance with the various embodiments, the context transfer signal 815 may, and in some embodiments does, include information pertaining to quality of service treatment, e.g., specification of traffic flow identification criteria, a traffic flow profile, service requirements and/or service constraints, for one or more traffic flows. The second access node 300' receives the context transfer signal 815 at point 815c and initiates the process of determining whether the quality of service treatment as indicated by the context transfer signal 815 will be supported and, if so, determining the appropriate access node 300' and end node 200 configurations, e.g., settings for one or more adjustable modules and/or values for one or more adjustable parameters, as needed to provide quality of service to each identified traffic flow. In accordance with various embodiments, the process of determining whether the indicated quality of service treatment will be supported includes, e.g., making a resource admission control determination and/or making a policy control determination.

In some embodiments, if the second access node 300' determines that additional or alternative configuration of the end node 200 is required, e.g., due to the admission or non-admission of various traffic flows, then the second access node 300' may exchange configuration signaling 820, 825 with the end node 200 at this point. FIG. 8 illustrates this optional configuration signaling exchange 820, 825. The second access node 300' at point 820c sends a configuration command signal 820, e.g., message, to the end node 200, instructing the end node 200 to implement a configuration operation corresponding to the configuration determined by the second access node 300'. In some embodiments, the configuration command signal 820 includes configuration information that enables the end node 200 to implement a configuration corresponding to one or more traffic flows e.g., to adjust the settings for one or more adjustable modules and/or adjust the values for one or more adjustable parameters. The configuration command signal instructs the end node 200 to, e.g., set the value of one or more internal parameters to parameter values determined by the second access node 300', and/or set the value of one or more internal parameters to values determined by the end node 200 based on parameter values determined by the second access node 300'. The end node 200 receives the configuration command signal 820 at point 820a and performs a configuration operation in accordance with the configuration information provided by the configuration command signal 820. The end node 200 at point 825a sends a configuration response signal 825 to the second access node 300', indicating that the configuration changes as instructed by the second access node 300' have been completed by the end node 200.

Note that at this point in the FIG. 8 exemplary signaling diagram, while a link with the second access node 300' has been established, the original link with the first access node 300 may be either dropped or maintained for an arbitrary duration of time. Also, note that while signaling 830 to redirect traffic flows destined to the end node 200 via the second access router 300' (e.g., by updating routing/forwarding information) has not yet occurred, in some systems, it may be possible for the end node 200 to already send traffic flows via the link with the second access node 300'. Thus, the configuration signaling 820, 825 already exchanged with the end node 200 may, and in some embodiments does, pertain primarily to traffic flows sent from the end node 200, while configuration signaling 850, 855 pertaining to traffic flows destined to the end node 200 may be, and is some embodiments is, delayed until after the signaling 830 associated with redirecting traffic flows destined to the end node 200 (e.g., updating routing/forwarding information). As illustrated in the FIG. 8 exemplary signaling diagram, the end node 200 at point 830a sends a signal, part of the group of signals 830 to the second access node 300' to redirect routing/forwarding of traffic flows destined to the end node 200 via the second access node 300' (e.g., to update routing/forwarding information). The second access node 300' receives the signal, part of group of signals 830, at point 830c and performs operations as needed to update routing/forwarding information in various network nodes. Note that the process of updating routing/forwarding information may, and in some embodiments does, involve the exchange of additional signaling with other network nodes, e.g., the first access node 300.

Given that one or more traffic flows previously supported at the first access node 300 may not be admitted at the second access node 300', the second access node 300' may, and in some embodiments does, send a revocation notification signal 835, 840, 845 to one or more network nodes. FIG. 8 illustrates this optional revocation notification signaling 835, 840, 845. In FIG. 8, the second access node 300' sends a revocation notification signal 835 to the end node 200 at point 835c, a revocation notification signal 840 to the application server node 108 at point 840c, and a revocation notification signal 845 to the policy control node 106 at point 845c, in each case indicating that quality of service support for one or more traffic flows to and/or from the end node 200 have been terminated. The end node 200 receives its revocation notification signal 835 at point 835a, the application server node 108 receives its revocation notification signal 840 at point 840d, and the policy control node 106 receives its revocation notification signal 845 at point 845e. In each case, upon reception of the revocation notification signal 835, 840, 845 the respective receiving node performs additional operations as needed, e.g., deletion of internal state corresponding to the terminated quality of service support, logging of the event, etc.

Assuming that second access node 300' determined that additional or alternative configuration of the end node 200 is required, e.g., due to the admission or non-admission of various traffic flows, the second access node 300' at point 850c sends a configuration command signal 850, e.g., message, to the end node 200, instructing the end node 200 to implement a configuration operation corresponding to the configuration determined by the second access node 300'. In some embodiments, the configuration command signal 850 includes configuration information that enables the end node 200 to implement a configuration corresponding to one or more traffic flows e.g., to adjust the settings for one or more adjustable modules and/or adjust the values for one or more adjustable parameters. The configuration command signal instructs the end node 200 to, e.g., set the value of one or more internal parameters to parameter values determined by the second access node 300', and/or set the value of one or more internal parameters to values determined by the end node 200 based on parameter values determined by the second access node 300'. The end node 200 receives the configuration command signal 850 at point 850a and performs a configuration operation in accordance with the configuration information provided by the configuration command signal 850. The end node 200 at point 855a sends a configuration response signal 855 to the second access node 300', indicating that the configuration changes as instructed by the second access node 300' have been completed by the end node 200.

Figure 9:
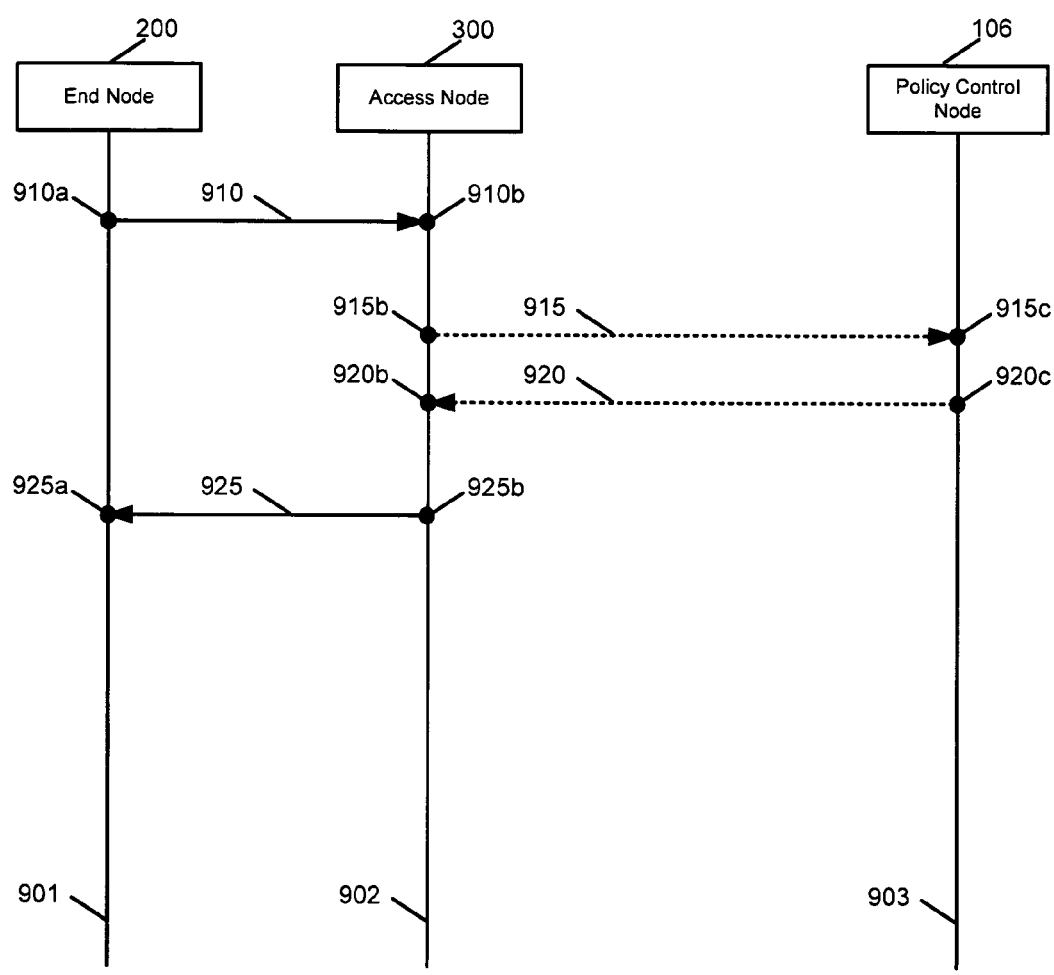
FIG. 9 illustrates exemplary signaling performed in accordance with various embodiments, when quality of service support for a traffic flow to or from an end node is added, modified, or deleted by the end node.

An exemplary reduced signaling Quality of Service Support Request will now be described. FIG. 9 illustrates exemplary signaling performed in accordance with various embodiments, when quality of service support for a traffic flow to and/or from an end node 200 is added, modified, or deleted by the end node 200. The exemplary signaling diagram depicted in FIG. 9 is an alternative to what is shown in FIG. 6 for the case where a quality of service support request 610, 910 is initiated by the end node 200. In FIG. 9, the end node 200 at point 910a sends a quality of service request signal 910 to the access node 300 requesting a change in quality of service support for one or more traffic flows. The quality of service request signal 910 may be, and is some embodiments is, used to request a variety of different quality of service support changes, e.g., add quality of service support for a new traffic flow, modify quality of service support of a previously known traffic flow, delete or terminate quality of service support of a previously known traffic flow. In each case, the quality of service request signal 910 may, and in some embodiments does, include information pertaining to quality of service treatment, e.g., specification of traffic flow identification criteria, a traffic flow profile, service requirements and/or service constraints, for one or more traffic flows to and/or from the end node 200. Furthermore, in the FIG. 9 example, the quality of service request signal 910 may, and in some embodiments does, define and/or imply access node 300 and end node 200 configurations as needed to provide the requested quality of service support, e.g., settings for one or more adjustable modules and/or values for one or more adjustable parameters, as needed to provide quality of service to each identified traffic flow. When the access node 300 receives the quality of service request signal 910 at point 910b, the access node 300 initiates the process of determining whether the requested quality of service support changes will be supported and, if so, whether the access node 300 and end node 200 configurations defined or implied by the quality of service request signal, e.g., proposed by the end node 200, are acceptable to the access node 300.

In accordance with various embodiments, the process of determining whether the requested quality of service support changes will be supported includes, e.g., making a resource admission control determination and/or making a policy control determination. As part of determining whether the requested quality of service support changes will be supported, the access node 300 may, and in some embodiments does, exchange signaling 915, 920 with a policy control node 106, e.g., a network node functioning as a policy decision point. FIG. 9 illustrates this optional policy control signaling exchange 915,920. In FIG. 6, the access node 300 at point 915b sends a policy decision request signal 915 to the policy control node 106 requesting a policy decision corresponding to the requested quality of service support changes. The policy control node 106 receives the policy decision request signal 915 at point 915c and performs a policy check, e.g., determines if requested quality of service support changes are authorized for the end node 200 and/or correspond to a valid application layer session. The policy control node 106 at point 920c send a policy decision response signal 920 to the access node 300, indicating whether the requested quality of service changes are approved. The access node 300 receives the policy decision response signal 920 at point 920b.

Given that the required resource admission control checks and/or policy control checks have passed and configurations defined or implied by the quality of service request signal, e.g., proposed by the end node 200, are acceptable to the access node 300, the access node 300 at point 925b sends a configuration command signal 925, e.g., message, to the end node 200, instructing the end node 200 to implement a configuration operation corresponding to the configurations defined or implied by the quality of service request signal 910. The configuration command signal 925 instructs the end node 200 to, e.g., set the value of one or more internal parameters to parameter values proposed by the end node 200 in the quality of service request signal 910 and determined to be acceptable by the access node 300. The end node 200 receives the configuration command signal 925 at point 925a and performs a configuration operation in accordance with the configuration defined or implied by the quality of service request signal 910. Alternatively, if the required resource admission control checks and/or policy control checks have failed and/or the configurations defined or implied by the quality of service request signal, e.g., proposed by the end node 200, are not acceptable to the access node 300, the configuration command signal 925 sent by the access node 300 instructs the end node 200 to abandon the configurations defined or implied by the quality of service request signal, e.g., proposed by the end node 200.

Figure 10:
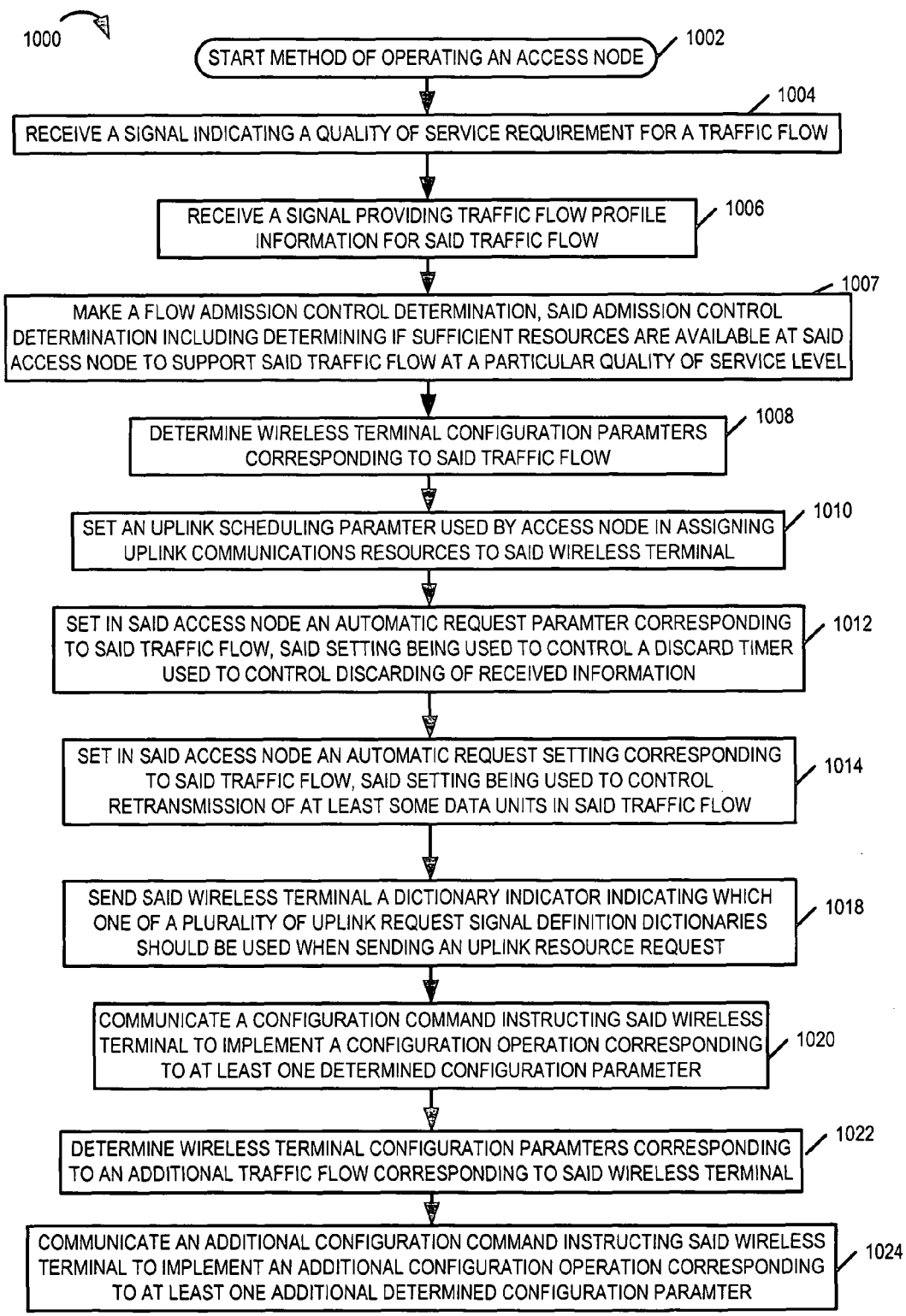
FIG. 10 is a drawing of a flowchart of an exemplary method of operating an access node, e.g., base station, in accordance with various embodiments.

FIG. 10 is a drawing of a flowchart 1000 of an exemplary method of operating an access node, e.g., base station, in accordance with various embodiments. Operation starts in step 1002 where the access node is powered on and initialized. Operation proceeds from start step 1002 to step 1004. In step 1004, the access node receives a signal indicating a quality of service requirement for a traffic flow. Operation proceeds from step 1004 to step 1006. In step 1006, the access node receives a signal providing traffic flow profile information for said traffic flow. Operation proceeds from step 1006 to step 1007. While in the illustrated embodiment both steps 1004 and 1006 are included, in some embodiments one but not necessarily both steps 1004 and 1006 are performed. When one but not both steps 1004 and 1006 are performed, the omitted step is skipped.

In step 1007, the access node makes a flow admission control determination, said admission control determination including determining if sufficient resources are available at said access node to support said traffic flow at a particular quality of service level. In some embodiments, the particular quality of service level that is taken into consideration is a level that is requested by the wireless terminal, e.g., in step 1004. Operation proceeds from step 1007 to step 1008.

In step 1008, the access node determines wireless terminal configuration parameters corresponding to said traffic flow.

In some embodiments, the determining of step 1008 includes determining wireless terminal configuration parameters required to satisfy said indicated quality of service requirement. In some embodiments, the determining of step 1008 includes determining wireless terminal configuration parameters required to support a traffic flow having the indicated traffic flow profile. Operation proceeds from step 1008 to step 1010.

In step 1010, the access node sets an uplink scheduling parameter used by the access node in assigning uplink communications resources to said wireless terminal. In some embodiments, the uplink communications resources are uplink traffic channel segments and said uplink traffic channel segments are assigned as a function of a latency requirement corresponding to said traffic flow. Operation proceeds from step 1010 to step 1012. While FIG. 10 shows an exemplary method being used with uplink flows, some embodiments are applied simply to downlink flows in which case step 1010 would be skipped. In step 1012, the access node sets in said access node an automatic request parameter corresponding to said traffic flow, said setting being used to control a discard timer used to control discarding of received information. Operation proceeds from step 1012 to step 1014. In step 1014, the access node sets in said access node an automatic request setting corresponding to said traffic flow, said setting being used to control retransmission of at least some data units in said traffic flow. Operation proceeds from step 1014 to step 1018. It should be appreciated that steps 1012 and 1014 may be implemented as optional steps and that in some embodiments these steps are skipped. In the case where the automatic request setting corresponds to an uplink flow, in step 1014, the access node may transmit the automatic request setting to, e.g., a wireless terminal, which can then use the setting to control uplink retransmissions. In such embodiments, the access node has knowledge of the repeat transmission setting and can take the setting into account while the wireless terminal implements uplink transmissions in accordance with the communicated setting.

In step 1018, where the access node sends the wireless terminal a dictionary indicator indicating which one of a plurality of uplink request signal definition dictionaries should be used when sending an uplink resource request. Operation proceeds from step 1018 to step 1020.

In step 1020, the access node communicates a configuration command instructing said wireless terminal to implement a configuration operation corresponding to at least one determined configuration parameter. In various embodiments, the step of communicating a configuration command includes transmitting said command to said wireless terminal over a wireless communications link. In various embodiments, said configuration command instructs the wireless terminal to perform at least one of: i) setting an internal parameter value determined by said access node; and ii) setting an internal parameter to a value determined by said wireless terminal based on a parameter determined by said access node. In some embodiments, said configuration command instructs said wireless terminal to perform an automatic repeat request configuration operation corresponding to said traffic flow. In some embodiments, said configuration command instructs the wireless terminal to set a request group corresponding to said traffic flow. In some embodiments, communicating a configuration command includes instructing said wireless terminal to set a minimum communication rate corresponding to said traffic flow. In some embodiments, communicating a configuration command includes instructing said wireless terminal to set a sharing weight corresponding to said traffic flow. In some embodiments, communicating a configuration command includes instructing said wireless terminal to store latency tolerance information specified by said access node for said traffic flow. In some embodiments, communicating a configuration command includes instructing said wireless terminal to store loss tolerance information specified by said access node for said traffic flow. In some embodiments, communicating a configuration command includes instructing said wireless terminal to set a minimum communications rate, latency tolerance and loss tolerance specified by said access node for said traffic flow. In some embodiments, the configuration command instructs the wireless terminal to set a scheduling parameter used to schedule transmission of data units corresponding to said flow. In some embodiments, the configuration command instructs the wireless terminal to set an automatic repeat request setting corresponding to said traffic flow, said setting being used to control retransmission of at least some data units in said traffic flow. In some embodiments, the configuration command instructs the wireless terminal to set an automatic repeat request parameter corresponding to said traffic flow, said setting being used to control a discard timer used to control discarding of received information. In some embodiments, said configuration command instructs the wireless terminal to set classifier parameters used to identify data units corresponding to said traffic flow. It should be appreciated that, depending on the embodiment, step 1018 may be implemented as part of step 1020 and need not be implemented as a separate step. Operation proceeds from step 1020 to step 1022.

In step 1022, the access node determines wireless terminal configuration parameters corresponding to an additional traffic flow corresponding to said wireless terminal. This may be in response to, e.g., an additional signal received by the access node. In some embodiments, said step of determining wireless terminal configuration parameters corresponding to said additional traffic flow is performed while said traffic flow is ongoing. Operation proceeds from step 1022 to step 1024. In step 1024, the access node communicates an additional configuration command instructing said wireless terminal to implement an additional configuration operation corresponding to at least one additional determined configuration parameter. While shown as additional steps, steps 1022, 1024 may be implemented as part of an ongoing process of receiving and processing signals, e.g., with these steps being implemented by iterating through steps 1004 through 1022 as part of processing an additional signal.

Figure 11:
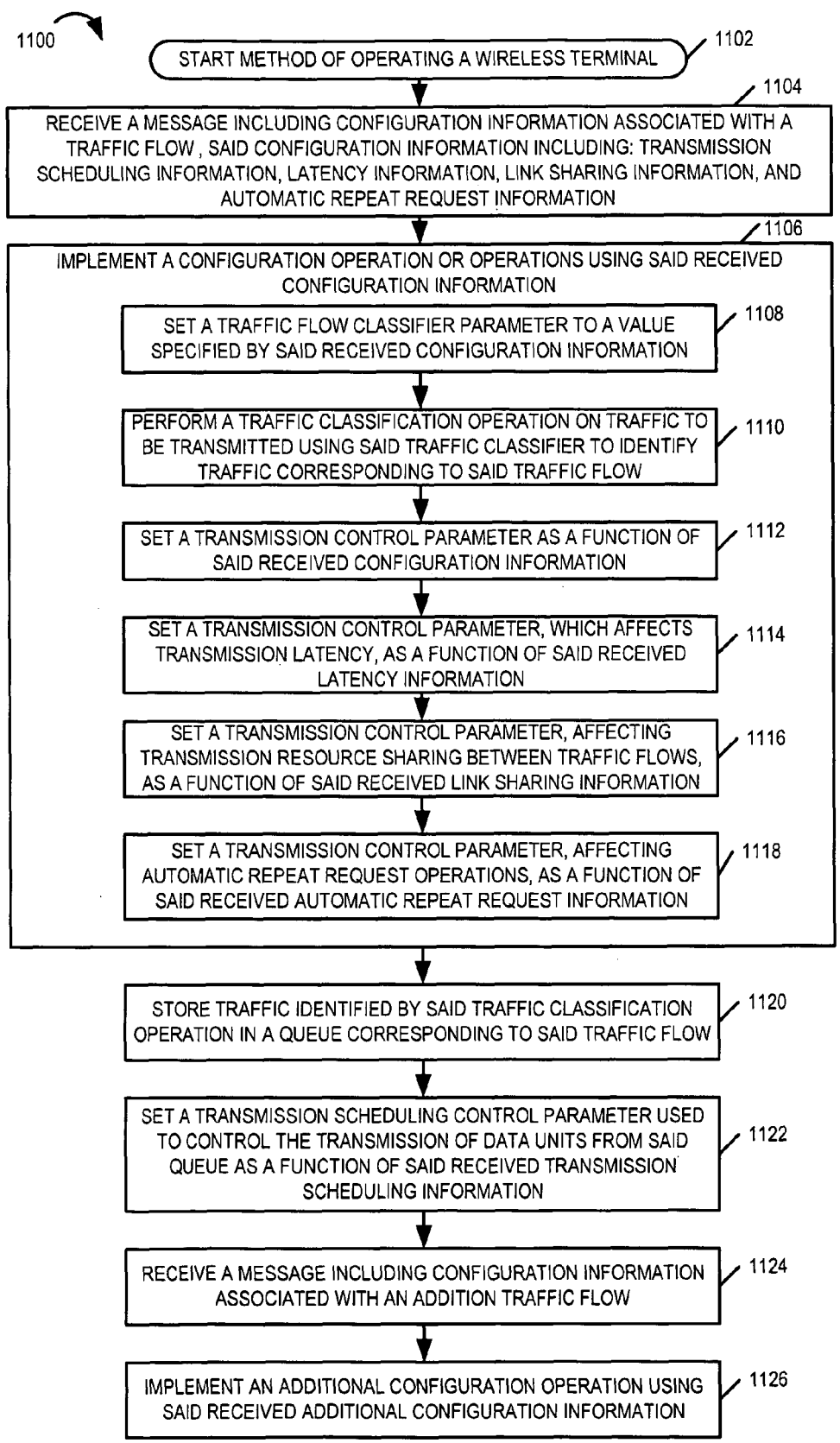
FIG. 11 is a flowchart of an exemplary method of operating a wireless terminal, e.g., mobile node, in accordance with various embodiments.

FIG. 11 is a flowchart 1100 of an exemplary method of operating a wireless terminal, e.g., mobile node, in accordance with various embodiments. Operation of the exemplary method starts in step 1102, where the wireless terminal is powered on and initialized. Operation proceeds from start step 1102 to step 1104. In step 1104, the wireless terminal receives a message including configuration information associated with a traffic flow, e.g., an uplink traffic flow, said configuration information including: transmission scheduling information, latency information, link sharing information, and automatic repeat request information. In some embodiments a plurality of messages are used to communicate configuration information associated with a traffic flow. It should be appreciated that depending on the embodiment, the received message or messages may apply to multiple flows in which case, processing may be performed with respect to each of the flows to which a message applies. Operation proceeds from step 1104 to step 1106.

In step 1106, the wireless terminal implements a configuration operation or operations using said received configuration information. Step 1106 includes sub-steps 1108, 1110, 1112, 1114, 1116, and 1118. In sub-step 1108, the wireless terminal sets a traffic flow classifier parameter to a value specified by said received configuration information. Operation proceeds from sub-step 1108 to sub-step 1110. In sub-step 1110, the wireless terminal performs a traffic classification operation on traffic to be classified using said traffic classifier to identify traffic corresponding to said traffic flow. While shown as part of the configuration processing of step 1106, it should be appreciated that traffic classification sub-step 1110 may, and often is, implemented as part of a data processing operation, e.g., after one or more configuration operations have been performed. Accordingly, the placement of sub-step 1110 within the overall method may vary depending on the particular embodiment.

In sub-step 1112, the wireless terminal sets a transmission control parameter as a function of said received configuration information. In sub-step 1114, the wireless terminal sets a transmission control parameter, which affects transmission latency, as a function of said received latency information. In sub-step 1116, the wireless terminal sets a transmission control parameter, affecting transmission resource sharing between traffic flows, as a function of said received link sharing information. In sub-step 1118, the wireless terminal sets a transmission control parameter, affecting automatic repeat request operation, as a function of said received automatic repeat request information. It should be appreciated that many of the substeps found in step 1106 are optional and, depending on the embodiment, various substeps may be omitted or performed at a different point within the method. For example sub-steps 1114, 1116. 1118 may be implemented as part of sub-step 1112.

Operation proceeds from step 1106 to step 1120. In step 1120, the wireless terminal stores traffic identified by said traffic classification operation in a queue corresponding to said traffic flow. While shown following step 1106, it should be appreciated that step 1120 would normally be implemented as a data processing operation and may be performed at various points in time, e.g., after one or more configuration operations relating to a flow have been performed. Operation proceeds from step 1120 to step 1122. In step 1122, the wireless terminal sets a transmission scheduling control parameter used to control the transmission of data units from said queue as a function of said received transmission scheduling information. In some embodiments, the transmission scheduling control parameter is a link sharing weight. Operation proceeds from step 1122 to step 1124. Step 1122 may be skipped or omitted in embodiments where such configuration operations are performed in one of the sub-steps of step 1106.

In step 1124, the wireless terminal receives a message including configuration information associated with an additional traffic flow. Operation proceeds from step 1124 to step 1126. In step 1126, the wireless terminal implements an additional configuration operation using said received additional configuration information. In some embodiments, implementing an additional configuration operation is performed while said traffic flow is ongoing. While shown as additional steps, steps 1124, 1026 may be implemented as part of an ongoing process of receiving and processing signals, e.g., with these steps being implemented by iterating through steps 1104 through 1122 as part of processing an additional signal.

In some embodiments, said received configuration message of step 1104 includes at least one of said transmission scheduling information, latency information, link sharing information, and automatic request information but does not include each of said transmission scheduling information, latency information, link sharing information, and automatic request information. In some such embodiments, at least one of: sub-step 1108, sub-step 1110, sub-step 1112, sub-step 1114, sub-step 1116, sub-step 1118, step 1120 and step 1122 is performed, but each of 1108, sub-step 1110, sub-step 1112, sub-step 1114, sub-step 1116, sub-step 1118, step 1120 and step 1122 is not performed corresponding to the received message.

Figure 12:
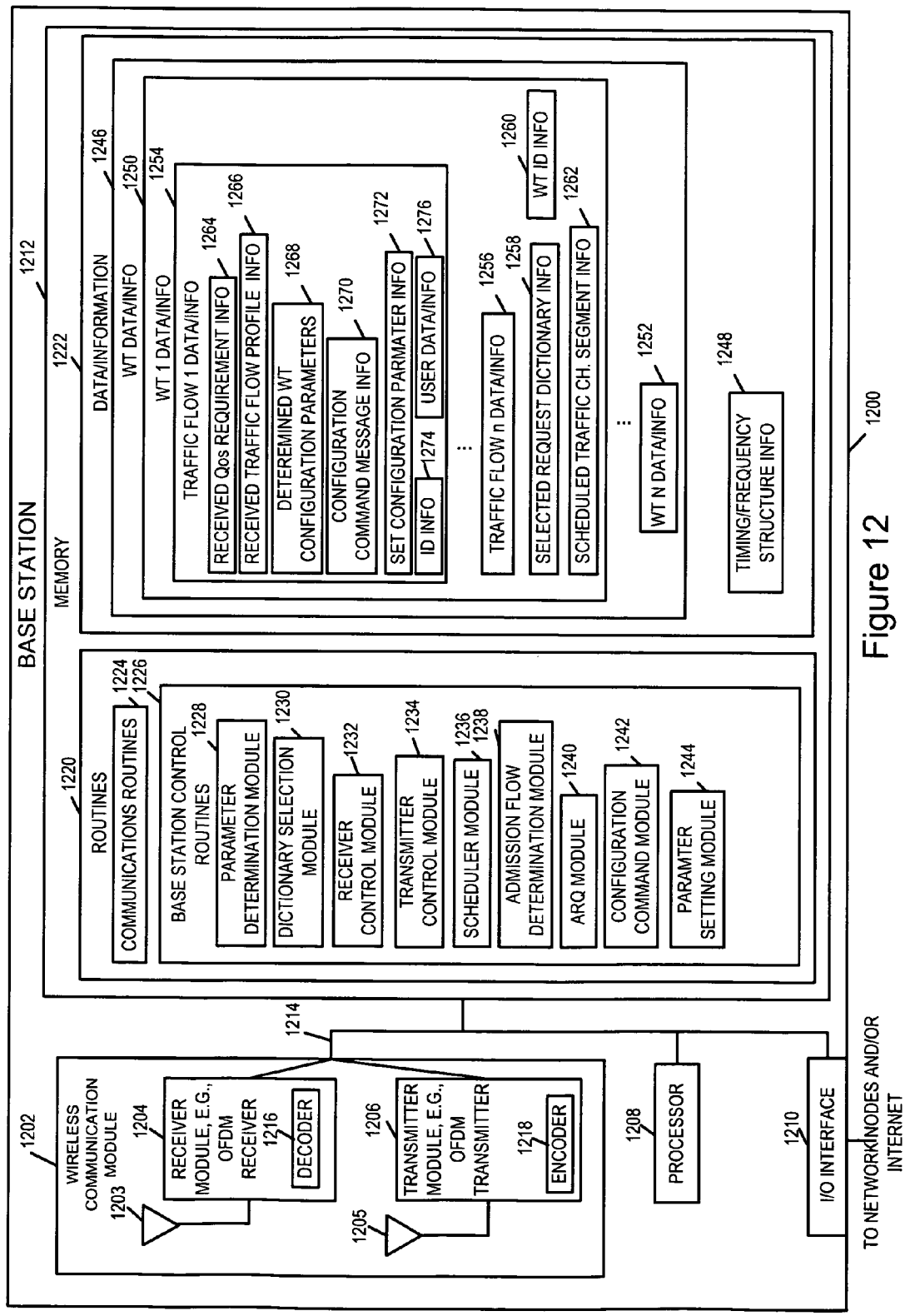
FIG. 12 is a drawing of an exemplary base station implemented in accordance with various embodiments.

FIG. 12 is a drawing of an exemplary base station 1200 implemented in accordance with various embodiments. Exemplary base station 1200 may be any of the exemplary access nodes of the exemplary system of FIG. 1.

Exemplary base station 1200 includes a wireless communications module 1202, a processor 1208, an I/O interface 1210, and a memory 1212 coupled together via a bus 1214 over which the various elements can interchange data/information. Memory 1212 includes routines 1220 and data/information 1222. The processor 1208, e.g., a CPU, executes the routines 1220 and uses the data/information 1222 in memory 1212 to control the operation of the base station 1200 and implement methods.

Wireless communications module 1202 includes a receiver module 1204, and a transmitter module 1206. The wireless communications module 1202 performs operations including communicating a configuration command instructing a wireless terminal to implement a configuration operation corresponding to at least one determined configuration parameter. The receiver module 1204, e.g., an OFDM receiver, is coupled to receive antenna 1203 via which the base station receives uplink signals from wireless terminals. The receiver module 1204 includes a decoder 1216 which decodes at least some of the received uplink signals. Received uplink signals include signals indicating a quality of service requirement for a traffic flow, signals providing traffic flow profile information for a traffic flow, request for traffic channel resources, and uplink traffic channel signals.

The transmitter module 1206, e.g., an OFDM transmitter, is coupled to transmit antenna 1205 via which the base station transmits downlink signals to wireless terminals. Transmitter module 1206 includes an encoder 1218 for encoding at least some of the downlink signals. Various transmitted downlink signals include timing/synchronization signals, base station assigned wireless terminal identification information, assignment information including traffic channel segment assignment information, configuration command messages, dictionary indicator signals, and downlink traffic channel signals. Transmitter module 1206 transmits a configuration command to a wireless terminal over a wireless communications link. At some times, the configuration command instructs a wireless terminal, to which the command is directed, to perform at least one of: setting an internal value to a parameter value determined by the base station; and ii) setting an internal parameter to a value determined by the wireless terminal based on a parameter determined by the base station. At some times, the configuration command instructs the wireless terminal to perform an automatic repeat request configuration operation corresponding to a traffic flow. At some times, the configuration command instructs a wireless terminal to set a request group corresponding to a traffic flow.

I/O interface 1210 couples the base station to other network nodes, e.g., other base stations, routers, access control nodes, mobility support nodes, policy control nodes, application server nodes, and/or the Internet. I/O interface 1210 by coupling the base station 1200 to a backhaul network allows a wireless terminal using a base station 1200 attachment point to participate in a communications session with a peer node using an attachment point of a different base station. Signals received via I/O interface 1210 may also include signals conveying a quality of service requirement and/or signals providing traffic flow profile information. For example, an application server node may send base station 1200 a quality of service request signal requesting a change in the quality of service support for one or more traffic flows.

Routines 1220 include communications routines 1224 and base station control routines 1226. The communications routines implement the various communications protocols used by the base station 1200. The base station control routines 1226 include a parameter determination module 1228, a dictionary selection module 1230, a receiver control module 1232, a transmitter control module 1234, a scheduler module 1236, an admission flow determination module 1238, an ARQ module 1240, a configuration command module 1242 and a parameter setting module 1244.

The parameter determination module 1228 determines wireless terminal configuration parameters corresponding to a traffic flow. At some times, the parameter determination module 1228 determines wireless terminal configuration parameters required to satisfy an indicated quality of service requirement. The dictionary selection module 1230 selects a dictionary for a wireless terminal and generates a message to be sent to the wireless terminal and controls sending of the message, said message including a dictionary indicator indicating which one of a plurality of uplink request signal definition dictionaries should by used by the wireless terminal when sending an uplink resource request to the base station. In some embodiments the information dictionary indicator is communicated as part of a message used to communicate other wireless terminal configuration information in addition to the dictionary indicator.

Receiver control module 1232 controls operation of receiver module 1204, while transmitter control module 1234 controls operation of transmitter module 1206. Scheduler module 1236, e.g., a scheduler, schedules uplink and downlink air link resources, e.g., segments, from/to wireless terminals, in accordance with implemented scheduling policy rules. The scheduler module 1236 uses, uplink scheduling parameters set by the base station in response to received QoS requirements for traffic flows and/or received traffic profile information in assigning uplink communications resources, e.g., uplink traffic channel segments, among the plurality of wireless terminals competing for those resources.

Admission flow determination module 1238 makes flow admission control determinations including determining if sufficient resources are available at the base station to support a traffic flow at a particular quality of service level. ARQ module 1240 performs various ARQ operations corresponding to traffic flows. The ARQ module 1240 uses automatic repeat request parameters set by the access node corresponding to a traffic flow in performing ARQ operations, e.g., a set parameter being used to control a discard timer used to control discarding of received information and/or a set parameter used to control retransmission of at least some data units in the traffic flow. Configuration command module 1242 generates configuration command messages to be communicated to wireless terminals. An exemplary generated configuration command message, associated with a traffic flow, includes at least one of: traffic flow classification information, transmission scheduling information, latency information, link sharing information and automatic repeat request information. Parameter setting module 1244 sets, in the base station, at least one of: an uplink scheduling parameter used by the base station in assigning resources to a wireless terminal, an automatic request setting corresponding to a traffic flow to control a discard timer, and an automatic request setting corresponding to a traffic flow used to control retransmission of at least some data units.

Data/information 1222 includes wireless terminal data/information 1246 and timing frequency structure information 1248. Wireless terminal data/information 1246 includes a plurality of wireless terminal data/information (WT 1 data/information 1250, . . . , WT N data/information 1252). WT 1 data/information 1250 includes one or more sets of traffic flow data/information (traffic flow 1 data/information 1254, . . . , traffic flow n data/information 1256), selected request dictionary information 1258, wireless terminal identification information 1260, and scheduled traffic channel segment information 1262.

Received QoS requirement information 1264 and received traffic flow profile information 1266 includes information received corresponding to WT 1 and traffic flow 1. It should be appreciated that for some traffic flows both QoS requirement information 1264 and traffic flow profile information 1266 may not be used, e.g., with a single one of these pieces of information being available and being used for a particular traffic flow. The received information may be obtained via wireless receiver module 1204 and/or I/O interface module 1210, e.g., depending on the source. For example, a WT 1 may request a change in quality of service corresponding to one or more flows and send the signal via wireless receiver module 1204. Alternatively, an application server node may request a change in quality of service corresponding to one or more traffic flows and signal the base station via I/O interface 1210. Determined wireless terminal configuration parameters 1268 are an output of parameter determination module 1228. Parameters determined by module 1228 may be communicated to WT 1 via configuration command messages generated by module 1242. Configuration command message information 1270 includes configuration command messages generated by module 1242 to be communicated to WT 1. Set configuration parameter information 1272 is an output of parameter setting module 1244 and is used by scheduler module 1236 and/or ARQ module 1240. Identification information 1274 includes information, e.g., header and/or other message field information, used to identify traffic flow 1. User data/information 1276 includes traffic flow 1 data/information being communicated, e.g., audio, voice, image, text, file, etc. user data being communicated via traffic channel segments.

Selected request dictionary information 1258, e.g., information identifying one of a plurality of potential request dictionaries that may be used by WT 1, is determined by selection module 1230 and communicated to WT 1. WT identification information 1260 includes WT 1 device identifiers, WT user identifiers, access identifiers, e.g., passwords, etc., base station 1200 assigned identifiers, e.g., a WT On state identifier temporarily assigned by BS 1200 to WT 1, the base station assigned identifier being used for identifying assignments directed to WT 1, e.g., in a recurring channel structure. Scheduled traffic channel segment information 1262 includes information identifying the uplink and downlink traffic channel segments assigned by scheduler module 1236 to WT 1.

Timing/frequency structure information 1248 includes timing and frequency structure information used by base station 1200, e.g., uplink carrier frequency information, uplink tone block information, downlink carrier frequency information, downlink tone block information, uplink tone hopping information, downlink tone hopping information, downlink channel structure information, uplink channel structure information, downlink recurring timing structure information, uplink recurring timing structure information, OFDM symbol transmission timing information, and information pertaining to groupings of OFDM symbols.

Figure 13:
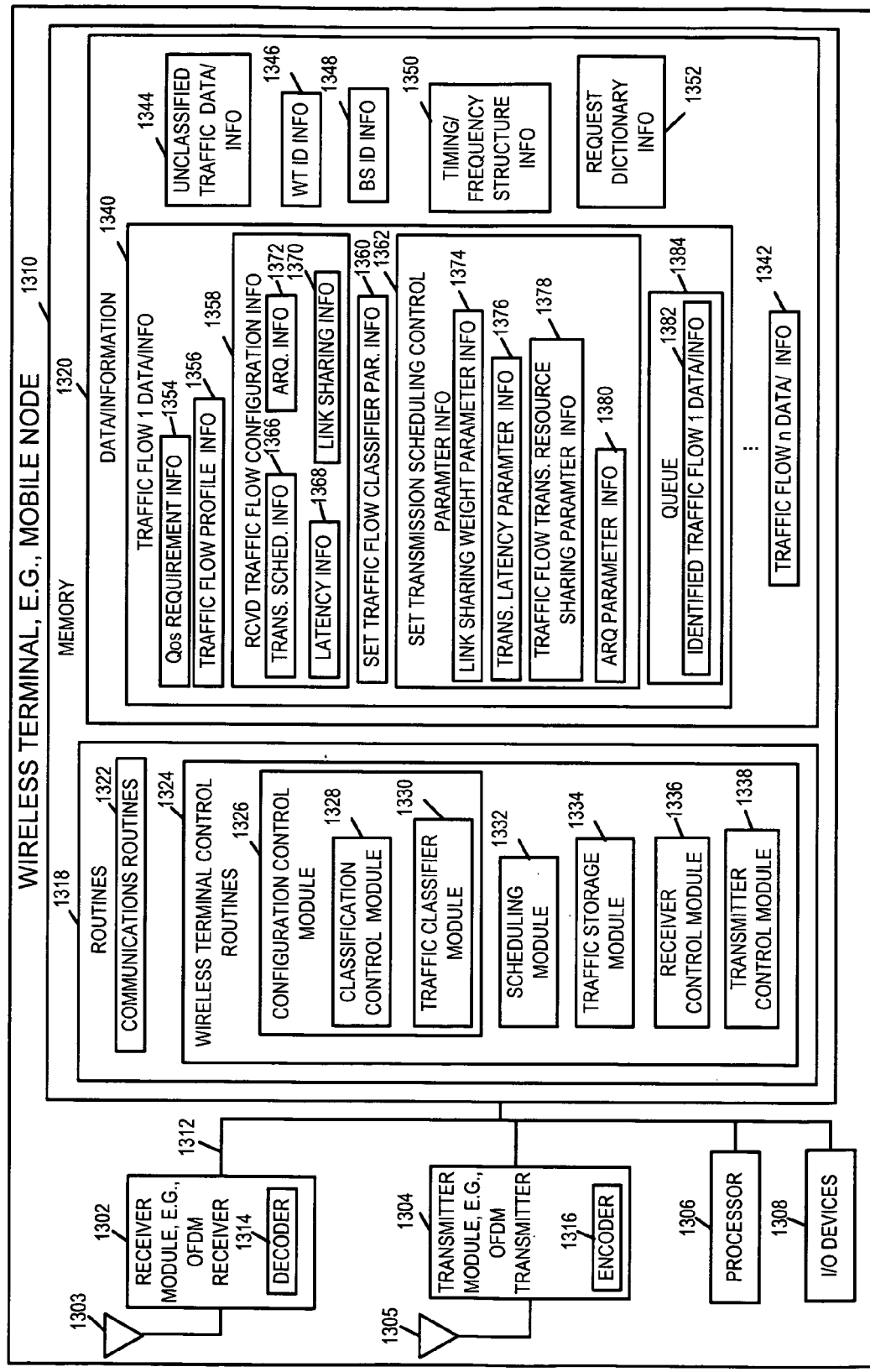
FIG. 13 is a drawing of an exemplary wireless terminal, e.g., mobile node, implemented in accordance with various embodiments.

FIG. 13 is a drawing of an exemplary wireless terminal 1300, e.g., mobile node, implemented in accordance with various embodiments. Exemplary wireless terminal 1300 may be any of the exemplary end nodes of the exemplary system 100 of FIG. 1. Exemplary wireless terminal 1300 includes a receiver module 1302, a transmitter module 1304, a processor 1306, I/O devices 1308, and a memory 1310 coupled together via a bus 1312 over which the various elements may interchange data and information. The memory 1310 includes routines 1318 and data/information 1320. The processor 1306, e.g., a CPU, executes the routines 1318 and uses the data/information 1320 in memory 1310 to control the operation of the wireless terminal 1300 and implement methods.

Receiver module 1302, e.g., an OFDM receiver, is coupled to receive antenna 1303 via which the wireless terminal 1300 receives downlink signals from base stations, e.g., base station 1200. The downlink signals include timing/synchronization signals, traffic flow associated configuration message signals, request dictionary indication signals, registration handshaking signals, assignment signals, and downlink traffic channel signals. Receiver module 1302 receives a message including configuration information associated with a traffic flow, e.g., an uplink traffic flow. Receiver module 1302 includes a decoder 1314 for decoding at least some of the received downlink signals.

Transmitter module 1304, e.g., an OFDM transmitter, is coupled to transmit antenna 1305 via which the wireless terminal transmits uplink signals to base stations. In some embodiments, the same antenna is used for transmitter and receiver, e.g., in conjunction with a duplexer module. Uplink signals include: registration request signals, QoS requirement information signals, traffic flow profile information signals, requests for uplink air link resources, and uplink traffic channel segment signals. Transmitter module 1304 includes an encoder 1216 for encoding at least some of the signals, e.g., uplink signals, transmitted by the wireless terminal 1300.

I/O devices 1308 include, e.g., microphone, keypad, keyboard, touch-screen, camera, speaker, display. I/O devices 1308 allow a user of WT 1300 to: input data/information, access output data/information, implement functions of WT 1300, and control applications.

Routines 1318 include communications routines 1322 and wireless terminal control routines 1324. The communications routines implement various communications protocols used by the wireless terminal 1300. The wireless terminal control routines 1324 include a configuration control module 1326, a scheduling module 1332, a traffic storage module 1334, a receiver control module 1336 and a transmitter control module 1338. The configuration control module 1326 includes a classification control module 1328 and a traffic classifier module 1330. While shown as elements within configuration control module 1326, modules 1328 and 1330 may be implemented as separate modules as opposed to being part of a larger configuration control module 1326.

Configuration control module 1326 implements a configuration operation or operations using received configuration information, e.g., received traffic flow configuration information 1358 obtained from a received configuration message or messages corresponding to traffic flow 1. The classification control module 1328 sets a traffic flow classifier parameter to a value specified by the received configuration information corresponding to the traffic flow. Set traffic flow classifier parameter information 1360 is an output of module 1328. The traffic classifier module 1330 performs traffic classification operations on traffic to be classified using the traffic flow classifier to identify traffic corresponding to the traffic flow. Thus module 1330 uses classifier information 1360 when evaluating unclassified traffic data/information 1344 to identify traffic flow 1 data/information 1382.

Scheduling module 1332 sets one or more transmission scheduling control parameters, identified in information 1362, used to control the transmission of data units from the queue 1384 as a function of the received transmission scheduling information included as part of information 1358. For example scheduling module 1332 sets a transmission latency parameter 1376 as a function of received latency information 1368; module 1332 sets an ARQ parameter 1380 as a function of received ARQ information 1372, etc.

Traffic storage module 1334 stores traffic, identified by a traffic classification operation, in a queue corresponding to the traffic flow. Thus traffic storage module 1334 is responsive to the traffic classifier module 1330, e.g., storing identified traffic flow 1 data/information 1382 in queue 1384. Receiver control module 1336 control operations of receiver module 1302, while transmitter control module 1338 controls operations of transmitter module 1304.

Data/information 1320 includes traffic flow 1 data/information 1340, . . . , traffic flow n data/information 1342, unclassified traffic data/information 1344, wireless terminal identification information 1346, base station identification information 1348, timing/frequency structure information 1350 and request dictionary information 1352. Traffic flow 1 data/information 1340 includes QoS requirement information 1354, traffic flow profile information 1356, received traffic flow configuration information 1358, set traffic flow classifier parameter information 1360, set transmission scheduling control parameter information 1362, and queue 1384. Received traffic flow configuration information 1358 includes transmission scheduling information 1366, latency information 1368, automatic repeat request information 1372, and link sharing information 1370. Set transmission scheduling control parameter information 1362 includes link sharing weight parameter information 1374, transmission latency parameter information 1376, traffic flow transmission resource sharing parameter information 1378 and ARQ parameter information 1380. The queue 1384 includes identified traffic flow 1 data/information 1382.

Messages described in the present patent application are stored in the memory of the nodes which generate and/or receive said messages in addition to the nodes through which said messages are communicated. Accordingly, in addition to being directed to methods and apparatus for generating, transmitting and using novel messages of the various embodiments, various embodiments are also directed to machine readable media, e.g., memory, which stores one or more of the novel messages of the type described and shown in the text and figures of the present application.

In various embodiments, nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above description. Such variations are to be considered within scope. The methods and apparatus may be, and in various embodiments are, used with OFDM, CDMA, TDMA or various other types of communications techniques which may be used to provide wireless communications links between access nodes and mobile nodes. In some embodiments the access nodes are implemented as base stations which establish communications links with mobile nodes using OFDM, CDMA and/or TDMA. In various embodiments the mobile nodes are implemented as notebook computers, PDAs, or other portable devices including receiver/transmitter circuits and logic and/or routines, for implementing methods.

What is claimed is:

1. A method of operating a wireless terminal comprising:
   transmitting a quality of service request signal to a communications node requesting a change in quality of service support being provided by said communications node to an existing traffic flow;
   receiving a message including configuration information associated with the existing traffic flow, wherein the configuration information comprises transmission scheduling information based on a power budget; and
   implementing a configuration operation using said received configuration information.

2. The method of claim 1,
   wherein said received message including configuration information associated with the existing traffic flow is in response to said quality of service request signal and includes a configuration command instructing the wireless terminal to implement a configuration change corresponding to a configuration setting defined or implied by said quality of service request signal.

3. The method of claim 2, wherein implementing said configuration operation includes:
   setting a traffic flow classifier parameter to a value specified by said received configuration information; and
   performing a traffic classification operation on traffic to be transmitted to said communications node using said traffic flow classifier to identify traffic corresponding to said existing traffic flow.

4. The method of claim 3, further comprising:
   storing traffic identified by said traffic classification operation in a queue corresponding to said existing traffic flow.

5. The method of claim 1, further comprising:
   setting a transmission scheduling control parameter used to control the transmission of data units corresponding to said existing flow to said communications node as a function of said received transmission scheduling information.

6. The method of claim 5,
   wherein said communications node is an access node; and
   wherein said transmission scheduling control parameter is a link sharing weight included in said received message.

7. The method of claim 1,
   wherein said communications node is an access node; and
   wherein said configuration operation includes setting a transmission control parameter used for controlling transmission to said as a function of said received configuration information.

8. The method of claim 7, wherein said received configuration information includes:
   latency information; and
   wherein setting a transmission control parameter includes setting a parameter affecting transmission latency.

9. The method of claim 7,
   wherein said received configuration information includes link sharing information; and
   wherein setting a transmission control parameter includes setting a parameter affecting transmission resource sharing between traffic flows.

10. The method of claim 7,
    wherein said received configuration information includes automatic repeat request information; and
    wherein setting a transmission control parameter includes setting a parameter affecting automatic repeat request operations related to said existing traffic flow.

11. The method of claim 1,
    wherein said received configuration information includes at least two of: latency information, link sharing information and automatic repeat request information, and
    wherein said configuration operation includes setting a plurality of transmission control parameters to values specified in said received configuration information.

12. The method of claim 1, wherein said communications node is an access node the method further comprising:
    receiving from said access node a second message, said second message including configuration information associated with an additional traffic flow corresponding to said wireless terminal; and
    implementing an additional configuration operation using said received additional configuration information.

13. The method of claim 12, wherein said implementing an additional configuration operation is performed while said existing traffic flow is ongoing.

14. A wireless terminal, comprising:
    a transmitter for transmitting a quality of service request signal to a communications node requesting a change in quality of service support being provided by said communications node to an existing traffic flow;
    a receiver for receiving a message including configuration information associated with the existing traffic flow, wherein the configuration information comprises transmission scheduling information based on a power budget; and
    a configuration control module for implementing a configuration operation using said received configuration information.

15. The wireless terminal of claim 14, wherein said received message including configuration information associated with the existing traffic flow is in response to said quality of service request signal and includes a configuration command instructing the wireless terminal to implement a configuration change corresponding to a configuration setting defined or implied by said quality of service request signal.

16. The wireless terminal of claim 15, wherein configuration control module includes:
    a classification control module for setting a traffic flow classifier parameter to a value specified by said received configuration information; and
    a traffic classifier module for performing a traffic classification operation on traffic to be transmitted to said communication node using said traffic flow classifier to identify traffic corresponding to said existing traffic flow.

17. The wireless terminal of claim 16, further comprising:
memory for storing traffic identified by said traffic classification operation in a queue corresponding to said existing traffic flow.

18. The wireless terminal of claim 14,
wherein said communications node is an access node, and the wireless terminal further comprising:
a scheduling module for setting a transmission scheduling control parameter used to control the transmission of data units from said queue as a function of said received transmission scheduling information.

19. The wireless terminal of claim 18, wherein said transmission scheduling control parameter is a link sharing weight included in said received message.

20. The wireless terminal of claim 14, further comprising a scheduling module for setting a transmission control parameter as a function of said received configuration information.

21. The wireless terminal of claim 20, wherein said received configuration information includes:
latency information; and
wherein said scheduling module sets a parameter affecting transmission latency.

22. The wireless terminal of claim 20,
wherein said received configuration information includes link sharing information; and
wherein said scheduling module sets a link sharing weight transmission control parameter affecting transmission resource sharing between traffic flows to a link sharing weight included in said received message.

23. The wireless terminal of claim 20,
wherein said received configuration information includes automatic repeat request information; and
wherein said scheduling module sets a parameter affecting automatic repeat request operations related to said existing traffic flow.

24. A wireless terminal, comprising:
means for transmitting a quality of service request signal to a communications node requesting a change in quality of service support being provided by said communications node to an existing traffic flow;
means for receiving a message including configuration information associated with the existing traffic flow, wherein the configuration information comprises transmission scheduling information based on a power budget; and
means for implementing a configuration operation using said received configuration information.

25. The wireless terminal of claim 24, wherein said received message including configuration information associated with the existing traffic flow is in response to said quality of service request signal and includes a configuration command instructing the wireless terminal to implement a configuration change corresponding to a configuration setting defined or implied by said quality of service request signal.

26. The wireless terminal of claim 25, wherein said means for implementing a configuration operation includes:
means for setting a traffic flow classifier parameter to a value specified by said received configuration information; and
means for performing a traffic classification operation on traffic to be transmitted to said communications node using said traffic flow classifier to identify traffic corresponding to said existing traffic flow.

27. The wireless terminal of claim 26, further comprising:
means for storing traffic identified by said traffic classification operation in a queue corresponding to said existing traffic flow.

28. The wireless terminal of claim 24, further comprising:
means for setting a transmission scheduling control parameter used to control the transmission of data units corresponding to said existing flow to said communications node from said queue as a function of said received transmission scheduling information.

29. The wireless terminal of claim 28, wherein said transmission scheduling control parameter is a link sharing weight included in said received message.

30. The wireless terminal of claim 24, further comprising:
means for setting a transmission control parameter as a function of said received configuration information.

31. A non-transitory computer readable medium embodying machine executable instructions for performing a method of operating a wireless terminal, the method comprising:
transmitting a quality of service request signal to a communications node requesting a change in quality of service support being provided by said communications node to an existing traffic flow;
receiving a message including configuration information associated with a traffic flow, wherein the configuration information comprises transmission scheduling information based on a power budget; and
implementing a configuration operation using said received configuration information.

32. The non-transitory computer readable medium of claim 31, wherein said received message including configuration information associated with the existing traffic flow is in response to said quality of service request signal and includes a configuration command instructing the wireless terminal to implement a configuration change corresponding to a configuration setting defined or implied by said quality of service request signal.

33. The non-transitory computer readable medium of claim 32, further embodying machine executable instructions for:
setting a traffic flow classifier parameter to a value specified by said received configuration information; and
performing a traffic classification operation on traffic to be transmitted to said communications node using said traffic flow classifier to identify traffic corresponding to said existing traffic flow;
as part of said step of implementing said configuration operation.

34. The non-transitory computer readable medium of claim 33, further embodying machine executable instructions for:
storing traffic identified by said traffic classification operation in a queue corresponding to said existing traffic flow.

35. The non-transitory computer readable medium of claim 31, further embodying machine executable instructions for:
setting a transmission scheduling control parameter used to control the transmission of data units corresponding to said existing flow to said communications node as a function of said received transmission scheduling information.

36. The non-transitory computer readable medium of claim 35,
wherein said communications node is an access node; and
wherein said transmission scheduling control parameter is a link sharing weight included in said received message.

37. The method of claim 2, wherein said message instructs the wireless terminal to set a value of at least one internal parameter to a parameter value proposed by the wireless terminal in the quality of service request signal which was determined to be acceptable to the communications node.

38. The method of claim 37, wherein said communications node is an access node.

39. The method of claim 1, wherein said quality of service request signal is a signal requesting termination of quality of service support for said existing traffic flow.

40. The method of claim 1, wherein said quality of service request signal includes traffic flow identification criteria and service requirement information corresponding to a plurality of different traffic flows.

41. The wireless terminal of claim 15, wherein said message instructs the wireless terminal to set a value of at least one internal parameter to a parameter value proposed by the wireless terminal in the quality of service request signal which was determined to be acceptable to the communications node.

42. The wireless terminal of claim 41, wherein said communications node is an access node.

43. The wireless terminal of claim 14, wherein said quality of service request signal is a signal requesting termination of quality of service support for said existing traffic flow.

44. The wireless terminal of claim 14, wherein said quality of service request signal includes traffic flow identification criteria and service requirement information corresponding to a plurality of different traffic flows.

45. The wireless terminal of claim 25, wherein said received message instructs the wireless terminal to set a value of at least one internal parameter to a parameter value proposed by the wireless terminal in the quality of service request signal which was determined to be acceptable to the communications node.

46. The wireless terminal of claim 45, wherein said communications node is an access node.

47. The wireless terminal of claim 24, wherein said quality of service request signal is a signal requesting termination of quality of service support for said existing traffic flow.

48. The wireless terminal of claim 24, wherein said quality of service request signal includes traffic flow identification criteria and service requirement information corresponding to a plurality of different traffic flows.

49. The non-transitory computer readable medium of claim 32, wherein said message instructs the wireless terminal to set a value of at least one internal parameter to a parameter value proposed by the wireless terminal in the quality of service request signal which was determined to be acceptable to the communications node.

50. The non-transitory computer readable medium of claim 49, wherein said communications node is an access node.

51. The non-transitory computer readable medium of claim 31, wherein said quality of service request signal is a signal requesting termination of quality of service support for said existing traffic flow.

52. The non-transitory computer readable medium of claim 31, wherein said quality of service request signal includes traffic flow identification criteria and service requirement information corresponding to a plurality of different traffic flows.

53. A wireless terminal, comprising:
   a processor configured to control said wireless terminal to:
      transmit a quality of service request signal to a communications node requesting a change in quality of service support being provided by said communications node with regard to an existing traffic flow;
      receive a message including configuration information associated with the existing traffic flow, wherein the configuration information comprises transmission scheduling information based on a power budget; and
      implement a configuration operation using said received configuration information.

54. The method of claim 1, wherein the configuration operation that is implemented by the wireless terminal comprises adjusting a value of an adjustable parameter, and wherein the configuration information that the wireless terminal receives from the communications node comprises an instruction to adjust the value of the adjustable parameter.

* * * * *